(12) United States Patent
Uemura

(10) Patent No.: US 8,073,901 B2
(45) Date of Patent: Dec. 6, 2011

(54) INFORMATION UPDATE METHOD AND INFORMATION UPDATE SYSTEM

(75) Inventor: Tetsuya Uemura, Sayama (JP)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 12/147,566

(22) Filed: Jun. 27, 2008

(65) Prior Publication Data

US 2009/0055440 A1 Feb. 26, 2009

(30) Foreign Application Priority Data

Aug. 21, 2007 (JP) .................................. 2007-214470

(51) Int. Cl.
G06F 15/16 (2006.01)
G06F 15/173 (2006.01)

(52) U.S. Cl. .......................... 709/203; 709/223; 709/242

(58) Field of Classification Search .......... 707/609–620, 707/636, 655–656, 695, 703–704; 709/203, 709/215–223, 206, 229

See application file for complete search history.

(56) References Cited

U.S. PATENT DOCUMENTS

| | | | | | |
|---|---|---|---|---|---|
| 5,884,327 | A * | 3/1999 | Cotner et al. | ......................... | 1/1 |
| 6,052,695 | A * | 4/2000 | Abe et al. | .............................. | 1/1 |
| 6,374,243 | B1 * | 4/2002 | Kobayashi et al. | .......... | 707/703 |
| 6,411,985 | B1 * | 6/2002 | Fujita et al. | ................... | 709/201 |
| 6,636,851 | B1 * | 10/2003 | Bamford et al. | ..................... | 1/1 |
| 6,751,634 | B1 * | 6/2004 | Judd | ..................................... | 1/1 |
| 6,799,188 | B2 * | 9/2004 | Weedon | .............................. | 1/1 |
| 6,963,914 | B1 * | 11/2005 | Breitbart et al. | ............. | 709/226 |
| 7,472,122 | B2 * | 12/2008 | Ishida et al. | ......................... | 1/1 |
| 2002/0013852 | A1 * | 1/2002 | Janik | .............................. | 709/231 |
| 2003/0041227 | A1 * | 2/2003 | Nakamatsu | .................... | 712/200 |
| 2005/0055385 | A1 * | 3/2005 | Sinha et al. | .................... | 707/203 |
| 2006/0031262 | A1 * | 2/2006 | Satoh et al. | ..................... | 707/200 |
| 2007/0139534 | A1 * | 6/2007 | Tsushio et al. | ........... | 348/231.99 |

(Continued)

FOREIGN PATENT DOCUMENTS

| | | |
|---|---|---|
| JP | 2004-295272 | 10/2004 |
| WO | WO 02/82319 | * 4/2002 |
| WO | WO 02/069172 | * 9/2002 |

OTHER PUBLICATIONS

Jin Hyun Son et al. "An analysis of the optimal number of servers in distributed client/server environments",Decision Support Systems 36 (2004) 297-312.*

*Primary Examiner* — Srirama Channavajjala
(74) *Attorney, Agent, or Firm* — Antonelli, Terry, Stout & Kraus, LLP.

(57) ABSTRACT

Information update technique where information held by every apparatus does not need to be updated at the same time. A first server is connected with a second server. The first server judges whether it is possible to access the second server. When a result of the judgment shows that the second server may be accessed, then the first server sends an information update request including information to the second server. On the other hand, when the result of the judgment shows that it is impossible to access the second server, the first server repeats the judgment until it becomes possible to access the second server. When it becomes possible to access the second server, the first server sends an information update request including the information to the second server. Receiving the information update request, the second server updates its information by replacing the information with new information, i.e. the information included in the information update request.

12 Claims, 14 Drawing Sheets

U.S. PATENT DOCUMENTS

| | | |
|---|---|---|
| 2007/0179929 A1* | 8/2007 | Fujiyama et al. .................. 707/1 |
| 2007/0282970 A1* | 12/2007 | Natarajan ..................... 709/217 |
| 2008/0130434 A1* | 6/2008 | Morimoto .................. 369/47.14 |
| 2008/0147750 A1* | 6/2008 | Zondervan et al. ........... 707/202 |
| 2008/0243865 A1* | 10/2008 | Hu et al. ......................... 707/10 |
| 2009/0165144 A1* | 6/2009 | Fujita .............................. 726/26 |

* cited by examiner

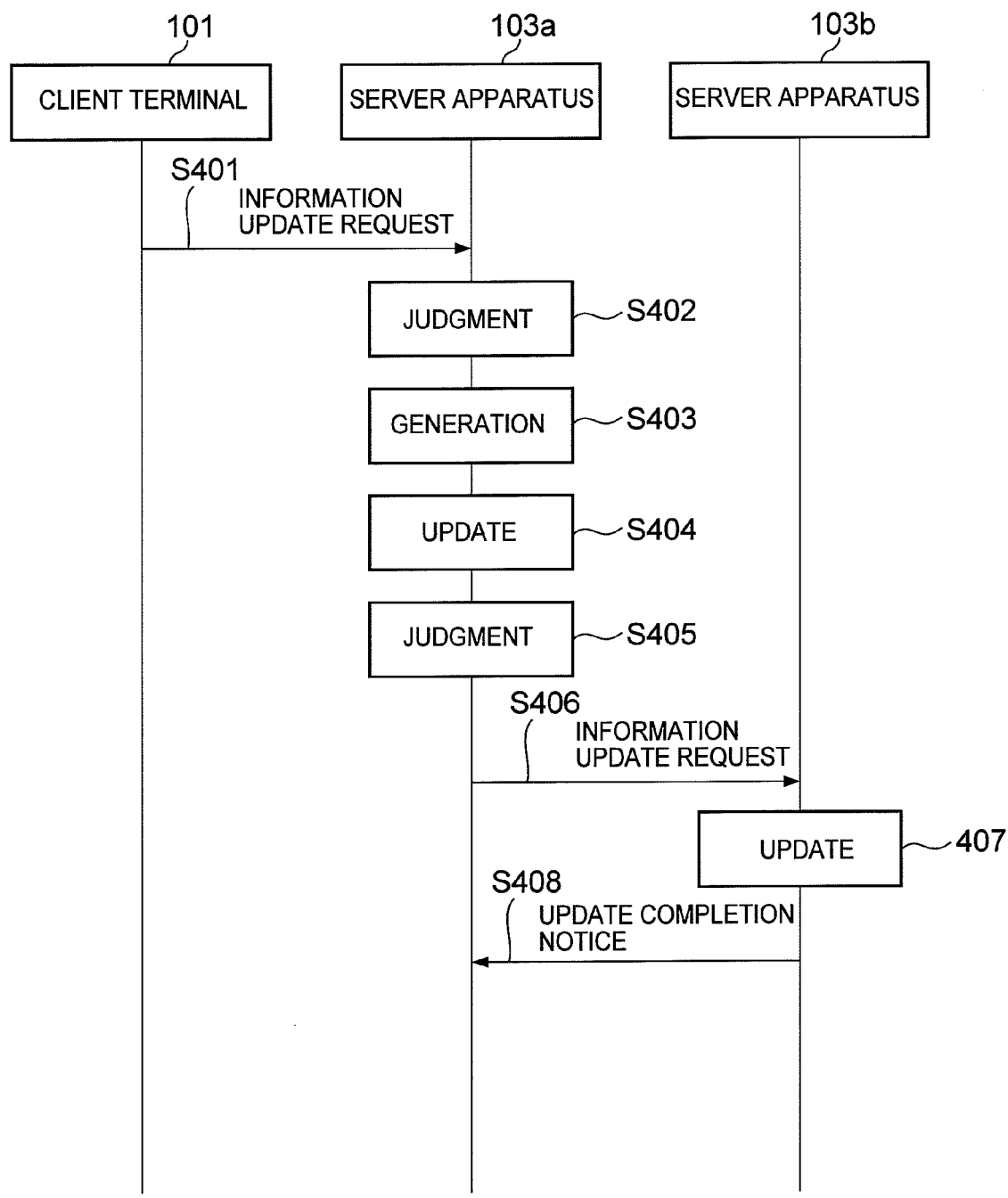

INFORMATION UPDATE METHOD AND INFORMATION UPDATE SYSTEM

BACKGROUND OF THE INVENTION

The present invention relates to a technique of updating a database.

In a distributed database system where a plurality of databases operate in a coordinated manner, update of the database should be performed so that information inconsistency does not occur between the databases. As one of such update methods, there is the "two-phase commit" protocol. Patent Document 1 describes a technique of using the two-phase commit.

In the two-phase commit, one database becomes a coordinator and the other databases cohorts. The two-phase commit includes a commit request phase and a commit phase. An execution procedure for a commit request phase is as follows.
1. The coordinator sends a message "Commit to the database may be executed?" to all the cohorts.
2. Each cohort proceeds with the transaction to the state where commit may be executed. Further, each cohort writes the entry into an undo log and a redo log.
3. Each cohort responds with a "agreement" message when the transaction is successful, or with a "halt" message when the transaction ends in failure.
4. The coordinator awaits reception of response messages from all the cohorts.

There are two types of commit phase, i.e. a success commit phase and a failure commit phase. A success commit phase is for the case where "agreement" messages have been received from all the cohorts. And, a failure commit phase is for the case where a cohort has responded with a "halt" message. An execution procedure for a success commit phase is as follows.
1. The coordinator sends a message "Execute commit" to all the cohorts.
2. Each cohort completes its operations, and releases all locks and resources held in the course of the transaction.
3. Each cohort sends a "completion response" message to the coordinator.
4. When the completion responses are received from all the cohorts, the coordinator considers that the transaction has been completed.

An execution procedure for a failure commit phase is as follows.
1. The coordinator sends a message "Execute roll-back" to all the cohorts.
2. Using the undo log, each cohort recovers the state before the execution of transaction, and releases all locks and resources held in the course of the transaction.
3. Each cohort sends a "completion response" message to the coordinator.
4. When completion responses are received from all the cohorts, the coordinator considers that the transaction has been completed.

According to the two-phase commit, all databases either complete update of registered information or return to the state before the update of the registered information. As a result, there will not arise a state where consistency between databases is lost, such as a state where some databases have completed their update while the other databases have not been updated, for example.

Patent Document 1: Japanese Un-examined Patent Application Laid-Open No. 2004-295272

Now, it is considered that a plurality of home apparatuses would operate with apparatuses which are provided with respective databases in a coordinated manner. In such a case, it is considered that consistency between these databases should be ensured. However, it is not expected in a home that all apparatuses provided with databases are in an environment enabling their update at all times. For example, it may be considered that an apparatus is not always supplied with power. Or, for example, it may be considered that sometimes an apparatus is taken out from the home and can not be accessed. If the above-described two-phase commit is applied for updating databases in such an environment, update of all the apparatuses can not be done when there is only one apparatus which can not be updated.

However, home apparatuses may not require strict consistency in all databases. For example, in the case where information of databases is broadcast program guide information and a content of change in the information is a change in the cast members of a program, then it is not necessary that all the apparatuses have the changed broadcast program guide information at the same point of time.

SUMMARY OF THE INVENTION

The present invention has been made to update of all the apparatuses in the above circumstance. According to the present invention, even if all of information can not be updated at the same time, the un-updated information may be updated later.

The present invention provides an information update method for updating information stored in a second storage unit in a system in which a first server having a first storage unit is connected with a second server having the second storage unit, wherein: the first server executes: a judgment step in which it is judged whether the second server may be accessed; and an output step in which an information update request including the information is sent to the second server when a result of the judgment step shows that the second server may be accessed; and the second server executes: an update step in which the information included in the information update request is made to be stored in the second storage unit when the information update request is received.

Further, the present invention provides an information update method for updating information stored in a second storage unit in a system in which a first server having a first storage unit, a second sever having the second storage unit and a third server having a third storage unit are connected with one another, wherein: the first server executes: a judgment step in which it is judged whether the second server may be accessed; and a registration instruction step in which update instruction information including the information is sent to the third server when a result of the judgment step shows that the second server can not be accessed; the third server executes: a re-update instruction step in which: it is judged whether the second server may be accessed; an information update request including the information included in the update instruction information is outputted to the second server when a result of the judgment shows that the second server may be accessed; when the result of the judgment shows that the second server can not be accessed, it is judged after an elapse of a prescribed time whether the second server may be accessed, to repeat the judgment until it is judged that the second server may be accessed; and an information update request including the information is outputted to the second server when it is judged that the second server may be accessed; and the second server executes: an update step in which the second storage unit is made to store the information included in the information update request, when the information update request is received.

BRIEF DESCRIPTION OF THE DRAWINGS

FIG. 4 is a diagram showing an example of a sequence in the first embodiment;

DETAILED DESCRIPTION

Figure 1:
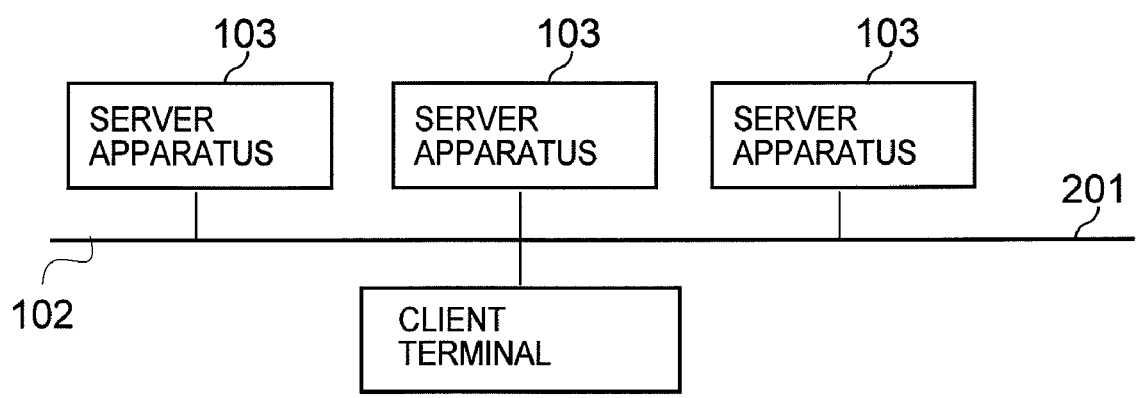
FIG. 1 is a diagram showing an example of a system configuration of a first embodiment.

In the following, embodiments of the present invention will be described in detail referring to the drawings.

First Embodiment

At the beginning, a first embodiment will be described.

The first embodiment described in the following is characterized in that a server apparatus immediately updates information of another server apparatus if the former server apparatus may access the latter server apparatus, and updates the information in a stage where the former server apparatus becomes able to access the latter server apparatus if the former server apparatus can not access the latter apparatus at present. In the following, a server apparatus that gives an instruction to update information is called a first server apparatus. And, a server apparatus that receives the instruction and updates the information is called a second server apparatus.

The mentioned information is not of specifically restricted kind. Here, however, it is assumed that a piece of information comprises respective value of a plurality of items. Further, it is assumed here that, among the plurality of items and their values, only items as update objects and their values are sent. However, it is not restrictive, and the whole information or information including non-updated items and their values may be sent.

First, referring to FIG. 1, an example of a system configuration of the present embodiment will be described.

In FIG. 1, the system of the present embodiment comprises a client terminal 101, a communication network 102, and a plurality of server apparatuses 103. Each of the client terminal 101 and the server apparatuses 103 is connected to the communication network 102.

The client terminal 101 is an information processing apparatus such as a Personal Computer (PC), for example. The communication network 102 is any network such as a Local Area Network (LAN), the Internet or the like, for example. A server apparatus 103 is an apparatus having a communication function and a storage unit, such as an information terminal, any household electrical goods having such function and unit, for example. Here, in the case where a specific individual server apparatus 103 should be described distinctively, it is described being referred to together with its symbol, as "server apparatus 103a", for example.

The example of FIG. 1 shows one client terminal 101 and three server apparatuses 103. However, the system may include any number of client terminals 101 and any number of server apparatuses 103, without being limited to the shown example.

Next, referring to FIG. 2A and FIG. 2B, examples of a configuration of the client terminal 101 will be described.

Figure 2A:
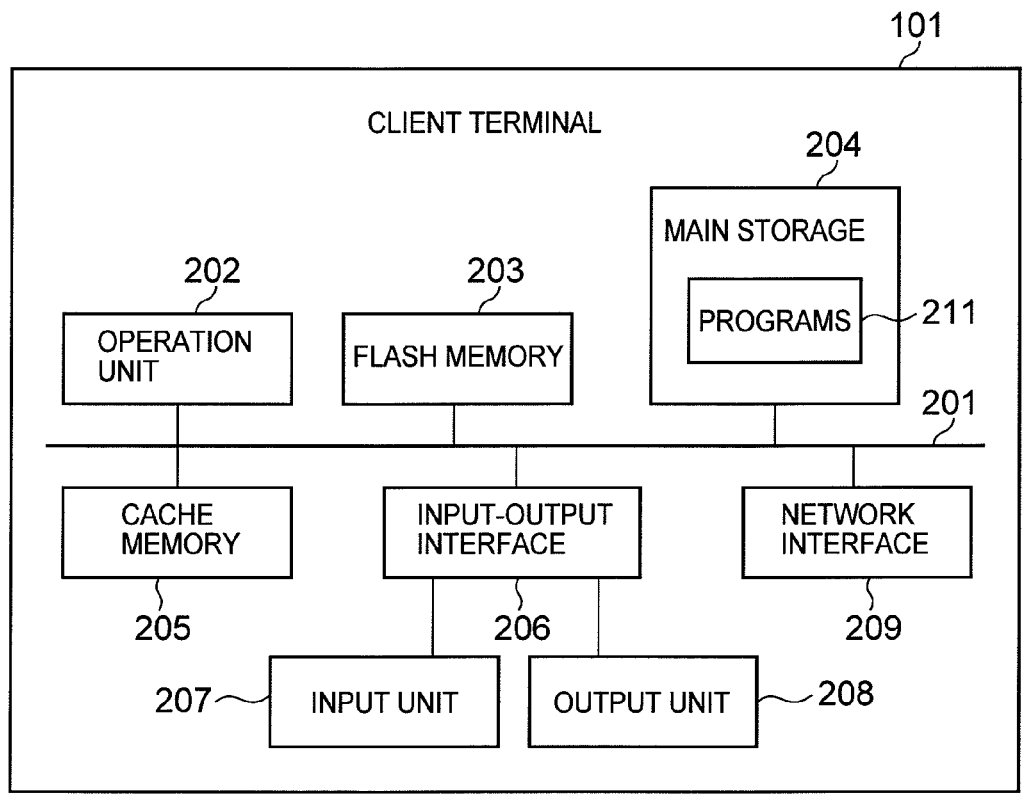
FIG. 2A is a diagram showing an example of a configuration of a client terminal in the first embodiment.

FIG. 2A is a diagram showing an example of a hardware configuration of the client terminal 101. In the example of FIG. 2A, the client terminal 101 comprises an internal bus 201, an operation unit 202, a flash memory 203, a main storage 204, a cache memory 205, an input-output interface 206, an input unit 207, an output unit 208, a network interface 209, and the like.

The operation unit 202 is a Micro Processing Unit (MPU), a Central Processing Unit (CPU), or the like, for example. The main storage 204 is a Synchronous Dynamic Random Access Memory (SDRAM) or the like, for example. The main storage 204 stores programs 211. The input unit 207 is a keyboard, a mouse, a scanner, a microphone and/or the like, for example. The output unit 208 is a display unit, a speaker, a printer and/or the like, for example.

Figure 2B:
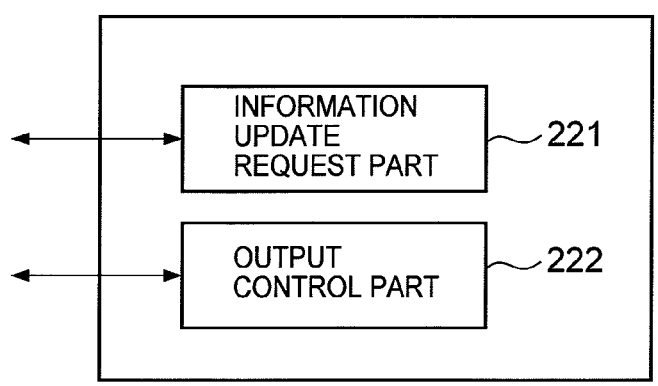
FIG. 2B is a diagram showing an example of a configuration of a client terminal in the first embodiment.

FIG. 2B is an example of a functional block diagram showing the client terminal 101. In the example of FIG. 2B, the client terminal 101 comprises an information update request part 221, an output control part 222, and the like. Each of the information update request part 221 and the output control part 222 is a function that is realized when the operation unit 202 loads and executes a program 211 stored in the main storage 204. The information update request part 221 sends a request for update of information to a server apparatus 103. The output control part 222 controls output of information to the output unit 209, and performs other functions.

Next, referring to FIG. 3A and FIG. 3B, examples of a configuration of a server apparatus 103 will be described.

Figure 3A:
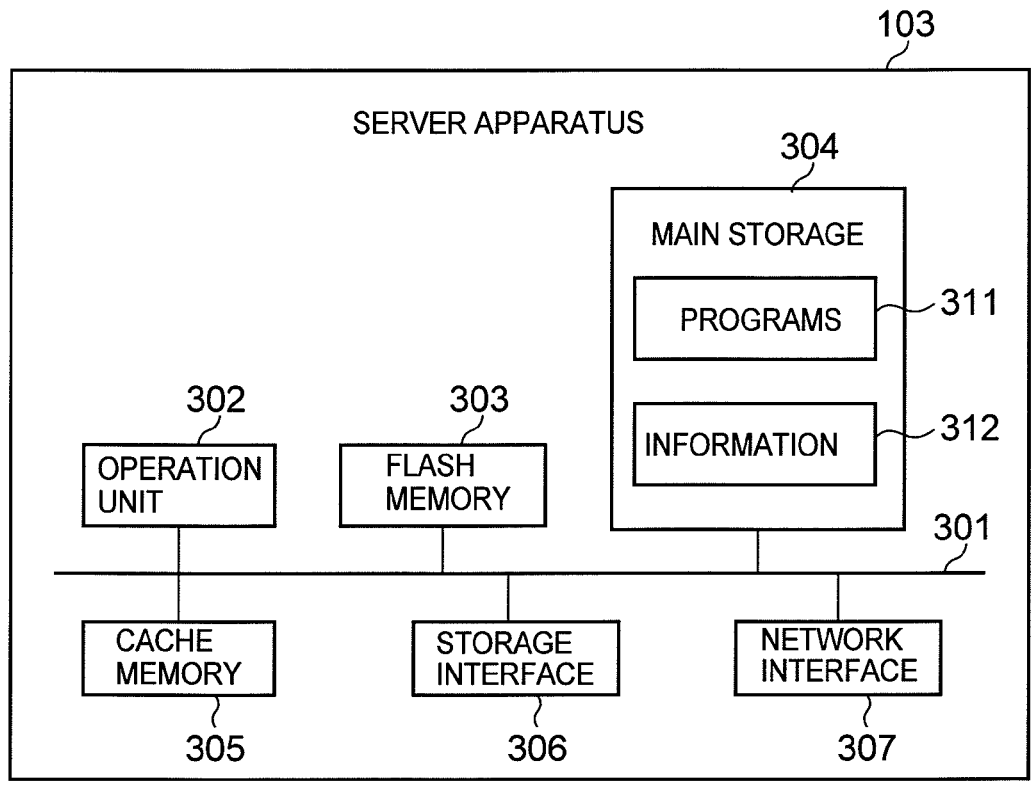
FIG. 3A is a diagram showing an example of a configuration of a server apparatus in the first embodiment.

FIG. 3A is a diagram showing an example of a hardware configuration of a server apparatus 103. In the example of FIG. 3A, a server apparatus 103 comprises an internal bus 301, an operation unit 302, a flash memory 303, a main storage 304, a cache memory 305, a storage interface 306, a network interface 307, and the like.

The operation unit 302 is an MPU, a CPU, or the like, for example. The main storage 304 is an SDRAM or the like, for example. The main storage 304 stores programs 311, information 312, and the like. The programs 311 realize the below-described functions. The information 312 may be updated.

Although, in the present embodiment, it is assumed that the information 312 as the target information of update is stored in the main storage 304, this is not restrictive. For example, the information 312 may be stored in a storage unit and a storage medium (both not shown) connected through the storage interface 306. Further, for example, the information 312 may be stored in a plurality of storage units and a plurality of storage media, such as the main storage 304 and storage units and storage media connected through the storage interface 306, in a distributed manner.

Figure 3B:
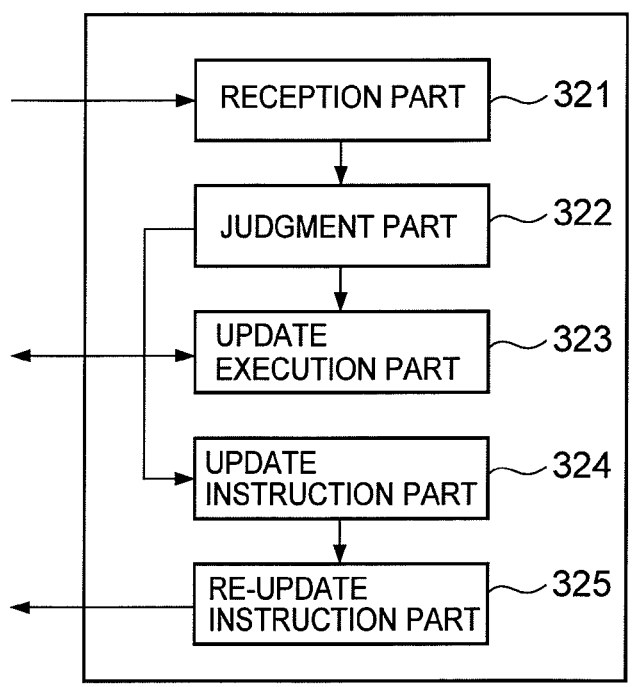
FIG. 3B is a diagram showing an example of a configuration of a server apparatus in the first embodiment.

FIG. 3B is an example of a functional block diagram showing a server apparatus 103. In the example of FIG. 3B, a server apparatus 103 comprises a reception part 321, a judgment part 322, an update execution part 323, an update instruction part 324, a re-update instruction part 325, and the like. Each of the reception part 321, the judgment part 322, the update execution part 323, the update instruction part 324, the re-update instruction part 325 and the like is a function that is realized when the operation unit 302 executes a program 311.

The reception part 321 receives an information update request concerning the information 312 from the client terminal 101 or another server apparatus 103. The judgment part 322 judges which server apparatus 103 is made to update the information. The update execution part 323 updates its own information 312. The update instruction part 324 performs processing for making the information of another server apparatus 103 be updated. The re-update instruction part 325 sends an information update request until it becomes possible to access the server apparatus 103 as the object of update.

In addition to the above-described hardware and functions, a server apparatus 103 may have other hardware and functions for processing using the information 312. For example, in the case where the information 312 is broadcast program guide information and the server apparatus 103 is a television apparatus, it is suitable for the server apparatus 103 to have a display unit or the like for displaying the broadcast program guide information, an input unit such as buttons to be operated using the displayed broadcast program guide information, and functions of processing according to such operations.

Next, an example of operation will be described.

First, an example of sequence is described simply. Then, an example of detailed operation of each apparatus will be described in detail. Here, the description will be given taking an example where the first server apparatus is the server apparatus 103a and the second server apparatus is the server apparatus 103b.

Further, in the following, an operational example where only one kind of information is updated. However, the information held by one server apparatus 103 is not limited to one kind of information, and may have kinds of information such as broadcast program guide information, family schedule information, and the like. In the latter case, the following operation is performed for each kind of information.

First, referring to FIG. 4, an example of a sequence will be described.

The information update request part 221 of the client terminal 101 sends an information update request to the server apparatus 103a (S401). This information update request includes already-registered information, information to replace the already-registered information, and information indicating that the source of this information update request is the client terminal 101. In the following, information to replace the already-registered information is referred to as "new information", and the already-registered information as "old information". Further, here it is assumed that a file name of information includes information indicating the kind of the information and information used for identifying each piece of past-registered information. For example, "information used for identifying each piece of past-registered information" is a version, a acquisition date of the information, or the like. However, the embodiment is not limited to this. For example, an information update request may additionally include the information indicating the kind of the information and the information used for identifying each piece of past-registered information. Or, an information update request may include these pieces of information as another file than that of the information in question, for example.

Timing for the client terminal 101 to send an information update request is not particularly restricted. For example, an information update request may be sent when the user inputs an instruction to update information by using the input unit 207. Or, information update requests may be sent at prescribed time intervals or at prescribed dates, for example. Or, an information update request may be sent when the information stored in the main storage 204 or information (not shown) stored in an unshown storage medium or the like of the client terminal 101 is updated, for example. Or, an information update request may be sent when information is inputted from the outside through the network interface 209, for example.

The judgment part 322 of the server apparatus 103a judges whether the server apparatus 103a may access the server apparatus 103b or not (S402). Here, it is assumed that the server apparatus 103a can not access the server apparatus 103b. In that case, the update instruction part 324 of the server apparatus 103a generates update instruction data (S403). Further, the update execution part 323 replaces the information 312 in its own main storage 304 with new information included in a received information update request so that the new information becomes newly-registered information 312 (S404).

At any timing such as after a prescribed time for example, the re-update instruction part 325 of the server apparatus 103a judges again whether the server apparatus 103a may access the server apparatus 103b (S405). Here, it is assumed that the server apparatus 103a may access the server apparatus 103b. The re-update instruction part 325 sends an information update request to the server apparatus 103b (S406). This information update request includes new information, old information, and information indicating that the source of this request is a server apparatus 103.

It is possible that the server apparatus 103b updates its own information and information of other server apparatuses. Here, description will be given taking the example where the server apparatus 103b updates only its own information.

The update execution part 323 of the server apparatus 103b replaces the information 312 in its own main storage 304 with new information included in the received information update request so that the new information becomes newly-registered information 312 (S407). When the information is updated, the update execution part 323 of the server apparatus 103b sends an update completion notice to the sender of the information update request, i.e. the server apparatus 103a to notify the completion of the update of the information (S408).

Next, referring to FIGS. 5 and 6, an example of operation of an individual server apparatus 103 will be described.

When the power supply to a server apparatus 103 is turned on, the operation unit 302 loads a boot program (not shown) stored in the flash memory 303 through the internal bus 301, and executes the boot program to initialize the main storage 304, the cache memory 305, the storage interface 306, and the network interface 307. Next, the operation unit 302 stores programs read from a storage unit or a storage medium (both not shown) through the storage interface 306 to the main storage 304. Here, the programs read into the main storage 304 may be any programs. As such programs, may be mentioned the programs 311 and programs (not shown) for using and/or managing the information, for example.

Figure 5:
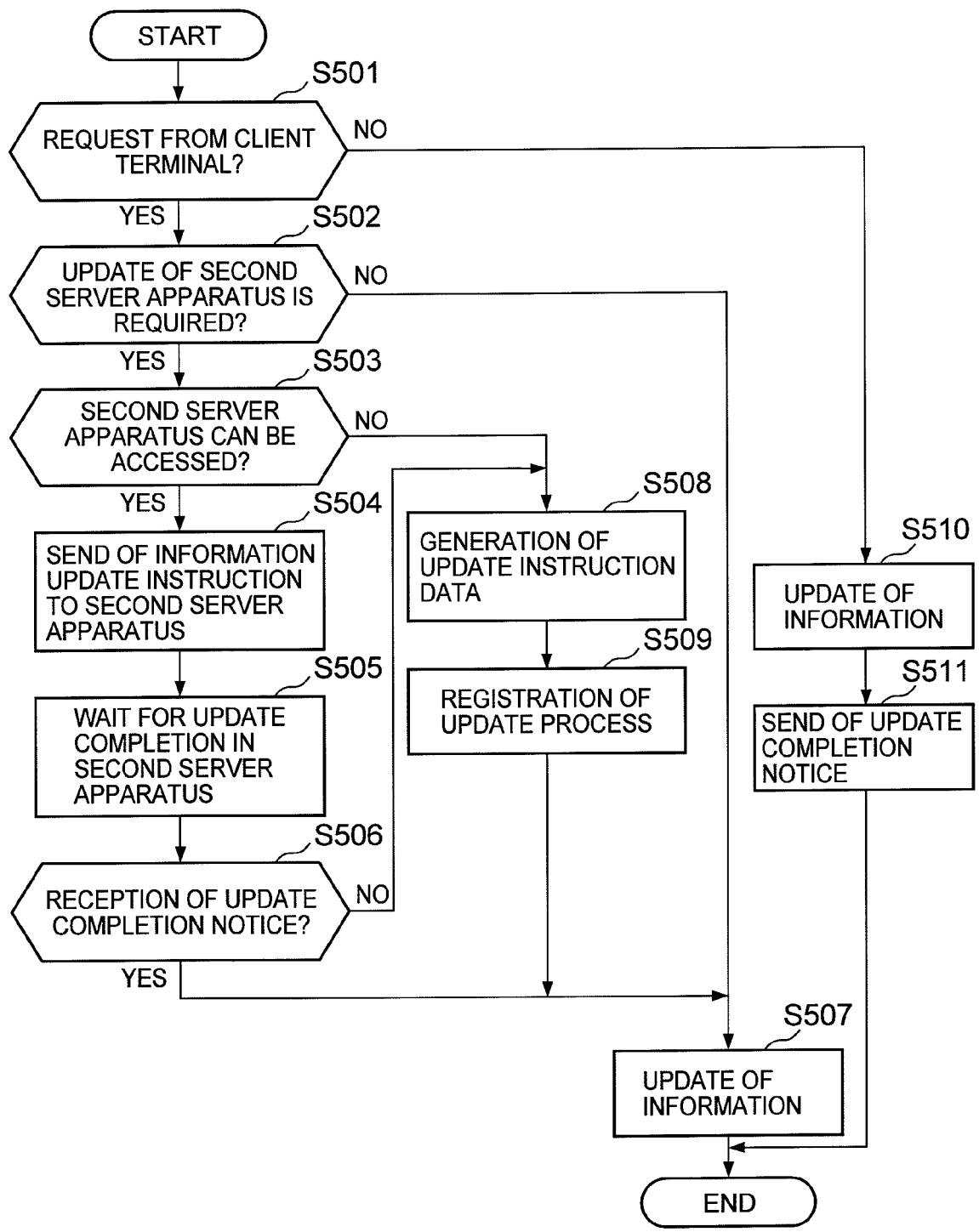
FIG. 5 is a chart showing an example of operation in the first embodiment.

The operation example shown in FIG. 5 is activated when an information update request is received from the client terminal 101 or another server apparatus 103, for example. As described above, this information update request includes new information, old information, and information indicating whether the source of this new information is the client terminal 101 or a server apparatus 103.

In FIG. 5, the reception part 321 of the server apparatus 103 judges whether the received request has been sent from the client terminal 101 or not (S501). For example, the reception part 321 may make the judgment on the basis of the information included in the information update request, i.e. the information indicating whether the source of the request is the client terminal 101 or a server apparatus 103.

When the judgment result in S501 shows that the request has been received from the client terminal 101, then judgment part 322 judges whether the information held by the second server apparatus 103 requires update or not (S502). To that end, the judgment part 322 judges whether its own server apparatus 103 is in a position to send an information update request to the second server apparatus 103 and whether the new information to be used for update requested by the information update request received this time has been already sent to the second server apparatus 103. Technique for judging whether its own server apparatus 103 is in a position to send an information update request to the second server apparatus 103 is not particularly restricted. For example, the main storage 304 or the like may previously store a table (not shown) that associates each kind of information with identification information of second server apparatuses 103 whose information of that kind becomes an object of update, so that the judgment part 322 judges whether the new information may be sent to the second server apparatus 103 in question on the basis of the information indicating the kind of the new information, which is included in the information update request. Further, technique for judging whether the new information to be used for the update requested by the information update request received this time has been already sent the second server apparatus 103 is not particularly restricted. For example, it may be judged depending on whether the server apparatus 103 received an update completion notice concerning the new information included in the information update request received this time in the past or not. This update completion notice will be described later.

When the result of judgment in S502 shows that the information held by the second server apparatus 103 does not require update, then the update execution part 323 performs the below-described processing of S507.

When the result of judgment in S502 shows that the information held by the second server apparatus 103 requires update, then the judgment part 322 judges when the second server apparatus 103 whose information to be updated may be accessed or not (S503). Processing for this end is not particularly restricted. For example, the judgment part 322 may send a connection request or the like to the second server apparatus 103 whose information is to be updated. Then, depending on whether a response indicating reception possibility is received from the second server apparatus 103 to which the connection request has been sent, the judgment part 322 may judge whether it is possible to access that server apparatus 103. This processing of S503 corresponds to the above-described processing of S402.

Here, the number of second server apparatuses 103 to which one server apparatus 103 sends an information update request may be any number. Also, technique for specifying a second server apparatus 103 to which an information update request is to be sent may be any technique. For example, a server apparatus 103 may take all the server apparatuses 103 connected to the communication network 102 as second server apparatuses 103. Or as described above, the main storage 304 or the like of a server apparatus 103 may, for example, previously store a table (not shown) that associates each kind of information with identification information or the like of server apparatuses 103 whose information of that kind becomes an object of update. Then, based on the information indicating the kind of the new information included in an information update request, the judgment part 322 may specify a second server apparatus 103 to which an information update request is to be sent.

When the result of judgment in S503 shows that it is possible to access the second server apparatus 103 whose information to be updated, then the update instruction part 324 sends an information update request to that server apparatus 103 (S504). At that time, the update instruction part 324 sends the information update request that includes the information included in the received information update request, i.e. the new information, the old information, and the information indicating that the source of this information update request is a server apparatus 103.

When the second server apparatus 103 receives the information update request from the server apparatus 103 in question, then the second server apparatus 103 updates the information held by the second server apparatus 103 itself. Thereafter, the second server apparatus 103 sends an update completion notice to the server apparatus 103 that has sent the information update request. This processing will be described in detail later.

After the processing of S504, the server apparatus 103 waits until the update completion notice is received from the second server apparatus 103 to which the information update request has been sent (S505). When the update completion notice is received from the second server apparatus 103, it is favorable that the update instruction part 324 stores the update completion notice in the main storage 304 or the like.

The update instruction part 324 judges whether the second server apparatus 103 to which the information update request was sent has updated the information (S506). This judgment is not particularly restricted. For example, when an update completion notice is not received in a prescribed time from the sending of the information update request according to the processing of S504, it is possible to judge that the server apparatus 103 has not updated the information.

When the result of judgment in S506 shows that the information is not updated, then the update instruction part 324 goes to the below-described processing of S508.

When the result of judgment in S506 shows that the information has been updated, or when the result of judgment in the above-described S502 shows that the information held by the second server apparatus 103 does not require update, then update execution part 323 updates its own information (S507). To that end, the update execution part 323 replaces the information 312 in the main storage 304 with the new information included in the received information update request. This processing of S507 corresponds to the above-described processing of S404.

On the other hand, when the result of judgment in the above-described S503 shows that it is impossible to access the second server apparatus 103 whose information is to be updated, then the update instruction part 324 generates update instruction data (S508). The update instruction data may include the identification information of the second server apparatus 103 whose information is to be updated, the new information, and the old information. The update instruction part 324 stores the generated update instruction data in any storage unit such as the main storage 304. This processing of S508 corresponds to the above-described processing of S403.

Here, in the case where there are a plurality of second server apparatuses 103 to which an information update request is sent, one piece of update instruction data may be generated for each server apparatus 103. Or, one piece of update instruction data may be generated for the plurality of server apparatuses 103.

After the processing of S508, the update instruction part 324 registers the update process as a background job (S509). By this operation, the re-update instruction part 325 is activated. Thereafter, the update execution part 323 performs the above-described processing of S507.

On the other hand, when the result of judgment in S501 shows that the source of the information update request is not the client terminal 101, then the source of the request is another server apparatus 103. In that case, the update execution part 323 updates the information held by its own server apparatus 103 (S510). This processing of S510 corresponds to the above-described processing of S407. To this end, the update execution part 323 replaces the information 312 in the main storage 304 with the new information included in the received information update request. Next, the update execution part 323 sends an update completion notice to the server apparatus 103 that has sent the information update request (S511). This update completion notice includes the identification information of its own server apparatus 103, a file name of the old information, a file name of the new information, the date of update of the information, and the like. This processing of S511 corresponds to the above-described processing of S408.

Next, an example of processing by the re-update instruction part 325 will be described referring to FIG. 6.

The above-described processing of S509 activates the re-update instruction part 325. The re-update instruction part 325 performs operation, an example of which is shown in FIG. 6, at prescribed time interval or at prescribed date, for example.

Figure 6:
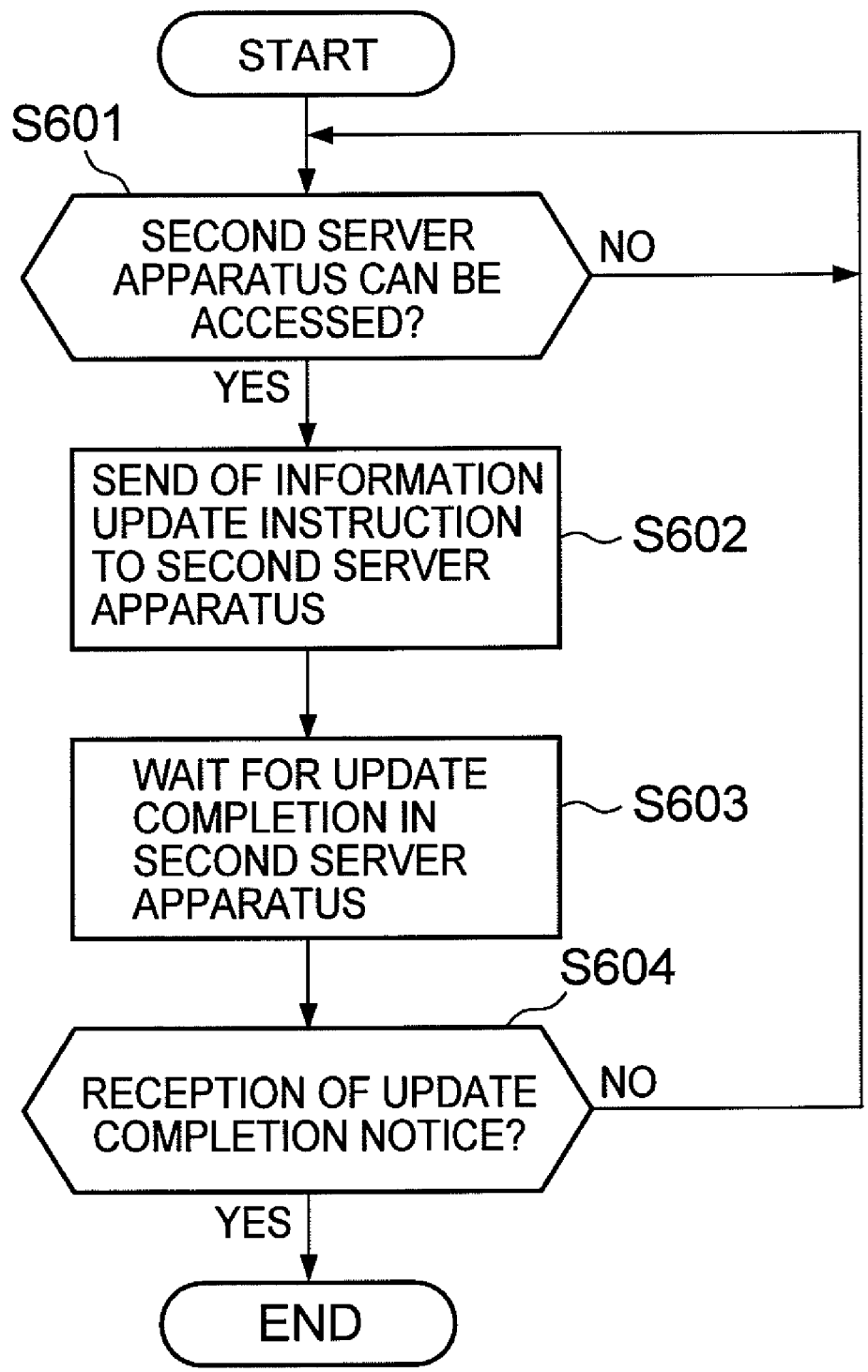
FIG. 6 is a chart showing an example of operation in the first embodiment.

In FIG. 6, the re-update instruction part 325 judges whether it is possible to access the second server apparatus 103 whose information is to be updated (S601). To that end, first the re-update instruction part 325 specifies the second server apparatus 103 to which an information update request is to be sent. To that end, the re-update instruction part 325 extracts the identification information of the server apparatus 103, which is included in the update instruction data stored in the main storage 304 or the like. Next, the re-update instruction part 325 sends a connection request or the like to the second server apparatus 103 specified by the extracted identification information. Then, depending on whether a response indicating possibility of reception is received from the second server apparatus 103 to which the connection request has been sent, the re-update instruction part 325 judges whether it is possible to access that second server apparatus 103. The processing of S601 corresponds to the above-described processing of S405.

When the result of judgment in S601 shows that it is possible to access the second server 103 whose information is to be updated, then the re-update instruction part 325 sends an information update request to that second server apparatus 103 (S602). At that time, the re-update instruction part 325 sends the information update request that includes the information included in the update instruction data, i.e. the new information, the old information, and the information indicating that the source of the information update request is a server apparatus 103. The new information and the old information are the information included in the update instruction data.

The processing of S602 corresponds to the above-described processing of S406.

Receiving the information update request from the server apparatus 103, the second server apparatus 103 updates the information that it holds, according to the processing described above referring FIG. 5. Thereafter, the second server apparatus 103 sends an update completion notice to the server apparatus 103 that has sent the information update request.

After the processing of S602, the server apparatus 103 waits until the update completion notice is received from the second server apparatus 103 to which the information update request has been sent (S603). An example of this processing is same as that for the above-described S505.

The re-update instruction part 325 judges whether the second server apparatus 103 to which the information update request has been sent has completed the update of the information (S604). An example of this processing is same as that for the above-described S506.

When the result of judgment in S604 shows that the update of the information of the second server apparatus 103 whose information is to be updated has not been completed, then the server apparatus 103 ends the processing in this time, and performs again the operation examples in and after the steps of the above-described S601 after an elapse of a prescribed time or at a prescribed date, for example.

Further, when the result of judgment in S604 shows that the update of the information of the second server apparatus 103 whose information is to be updated has been completed, then the re-update instruction part 325 deletes pieces of update instruction data that include new information whose file name coincides with the updated information's file name included in the update completion information among pieces of update instruction data stored in the main storage 304. Then, the re-update instruction part 325 ends the update processing concerning that new information.

Here, in the case where there are a plurality of second server apparatuses 103 to which an information update request is to be sent, the re-update instruction part 325 performs the above-described processing for each of those second server apparatuses 103. In the case where there are a plurality of second server apparatuses 103 to which an information update request has been sent, the re-update instruction part 325 may end the processing when all the second server apparatuses 103 have updated their information, or when a part of the second server apparatuses 103 has updated the information.

Although, in the above-described first embodiment, it has been assumed that each of server apparatuses holds a copy of a group of information pieces (items and item values), i.e. a part of information, this is not restrictive. The present embodiment may be easily applied to any form of data copying. For example, the present embodiment may be applied to the case where the whole information is duplicated among a plurality of server apparatuses.

Further, the new information or a pair of the new information and the old information has been used as the update instruction data. However, any value that may be used for updating the second server apparatus 103 may be held as the update instruction data.

Further, in the above embodiment, at the end of all the processes such as after completion of old information update processing, new update processing is performed. However, the turn of new update processing is not limited to this, and new update processing may be performed in any timing.

Second Embodiment

Next, a second embodiment will be described.

In comparison with the first embodiment, the second embodiment is characterized in that the first server apparatus immediately updates the information of the second server apparatus when the first server apparatus may access the second server apparatus, and that, when the first server apparatus may not access the second server apparatus, the first server apparatus asks a substitute server apparatus to instruct the second server apparatus to update its information. In the following, the substitute server apparatus is referred to as the third server apparatus.

In the following, the embodiment will be described in detail only with respect to different points from the above embodiment.

First, an example of sequence will be described simply. Then, an example of operation of each apparatus will be described in detail. Here, description will be given taking an example where the first server apparatus is the server apparatus 103a, the second server apparatus is the server apparatus 103b, and the third server apparatus is the server apparatus 103c.

Figure 7:
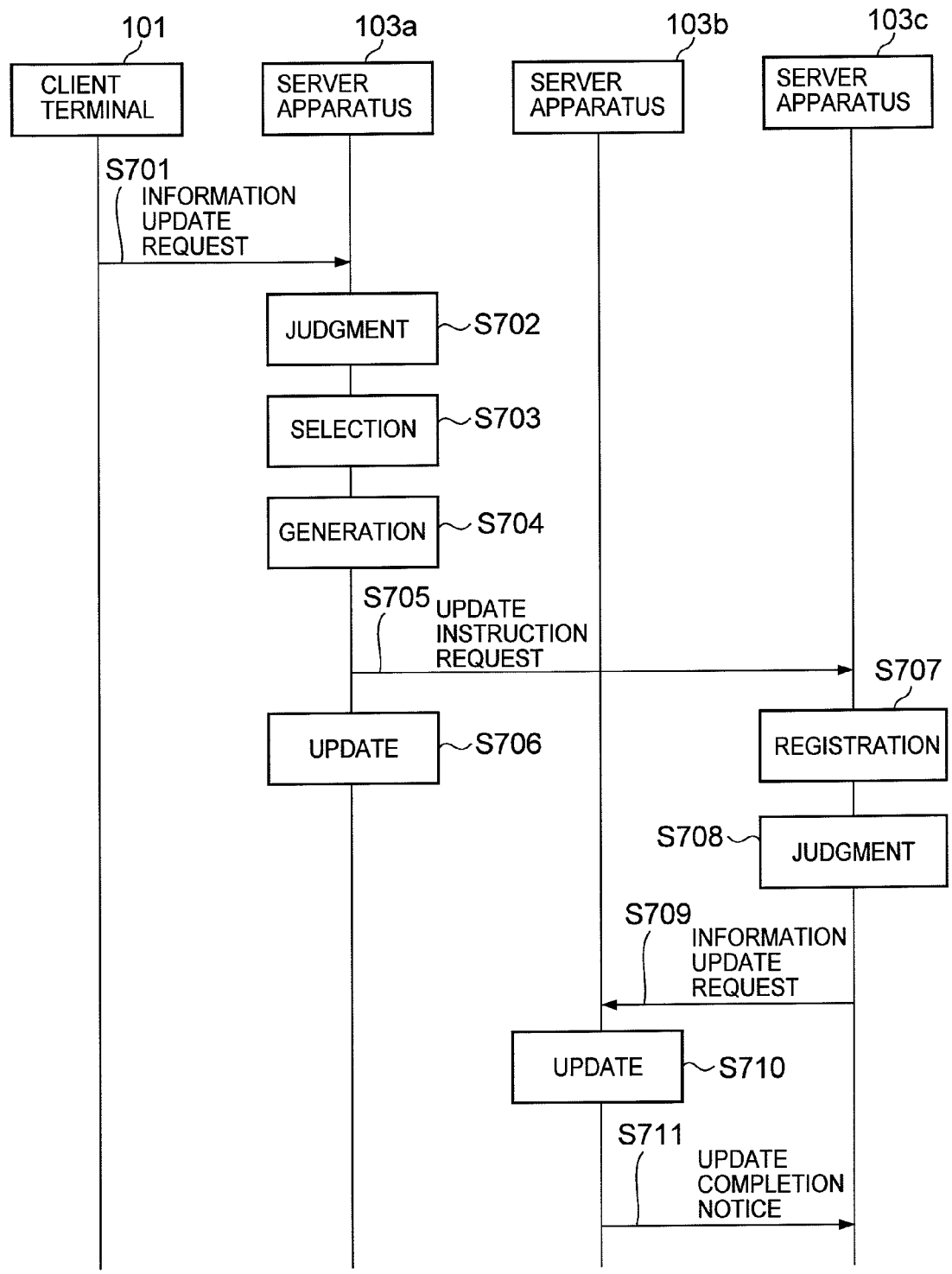
FIG. 7 is a diagram showing an example of a sequence in a second embodiment.

First, referring to FIG. 7, an example of sequence will be described.

The information update request part 221 of the client terminal 101 sends an information update request to the server apparatus 103a (S701). This information update request includes new information, old information, and information indicating that the source of this information update request is the client terminal 101. An example of this processing is same as that of the above-described S401.

The judgment part 322 of the server apparatus 103a judges whether the server apparatus 103a may access the server apparatus 103b (S702). Here, it is assumed that the server apparatus 103a can not access the server apparatus 103b. In that case, the update instruction part 324 of the server apparatus 103a selects the third server apparatus (S703). Here, it is assumed that the update instruction part 324 selects the server apparatus 103c as the third server apparatus. The update instruction part 324 generates update instruction data (S704), and sends an update instruction request, which includes the generated update instruction data, to the server apparatus 103c (S705). Further, the update execution part 323 replaces the information 312 in its own main storage 304 with the new information included in the received information update request so that the new information becomes newly-registered information 312 (S706).

Receiving the update instruction data, the re-update instruction part 325 of the server apparatus 103c registers the update instruction data (S707).

At any timing such as after a prescribed time for example, the re-update instruction part 325 of the server apparatus 103c judges whether the server apparatus 103c may access the server apparatus 103b (S708). Here, it is assumed that the server apparatus 103c may access the server apparatus 103b. The re-update instruction part 325 of the server apparatus 103c sends an information update request to the server apparatus 103b (S709). This information update request sent by the re-update instruction part 325 includes the new information, the old information, and the information indicating that the source of this information update request is a server apparatus 103. The new information, the old information are the information that has been included in the update instruction data.

The update execution part 323 of the server apparatus 103b replaces the information in its own main storage 304 with the new information included in the received information update request so that the new information becomes newly-registered information 312 (S710). When the information is updated, the update execution part 323 of the server apparatus 103b sends an update completion notice to the sender of the information update request, i.e. the server apparatus 103c to notify the completion of the update of the information (S711).

Next, referring to FIG. 8, an example of operation of an individual server apparatus 103 will be described.

Figure 8:
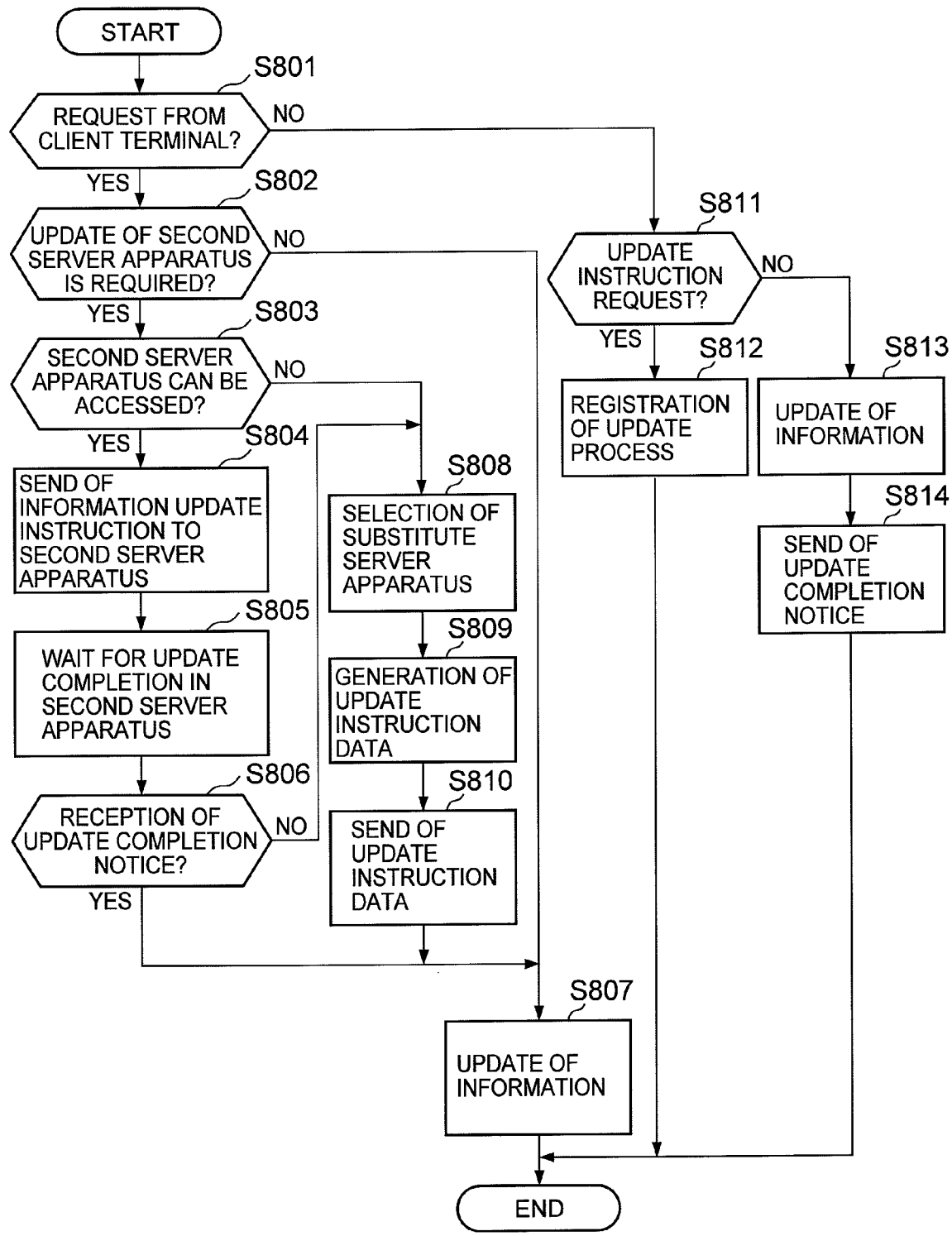
FIG. 8 is a chart showing an example of operation in the second embodiment.

The operation example shown in FIG. 8 is activated when an information update request or an update instruction request is received from the client terminal 101 or another server apparatus 103. An example of this operation is same as that of the above-described first embodiment, and thus its description is omitted.

In FIG. 8, the reception part 321 of a server apparatus 103 judges whether the received request has come from the client terminal 101 or not (S801). An example of this operation is same as that of the above-described S501.

When the result of judgment in S801 shows that the request has come from the client terminal 101, then the judgment part 322 judges whether the information held by the second server apparatus requires update (S802). An example of this operation is same as that of the above-described S502.

When the result of judgment in S802 shows that the information held by the second server apparatus 103 does not require update, then the update execution part 323 performs the below-described processing of S807.

When the result of judgment in S802 shows that the information held by the second server apparatus 103 requires update, then the judgment part 322 judges whether it is possible to access the second server apparatus 103 whose information is to be updated (S803). An example of this processing is same as that of the above-described S503.

When the result of judgment in S803 shows that it is possible to access the second server apparatus 103 whose information is to be updated, then the update instruction part 324 sends an information update request to that second server apparatus 103 (S804). An example of this processing is same as that of the above-described S504.

When the second server apparatus 103 receives the information update request from the server apparatus 103, the second server apparatus 103 updates its own information, and thereafter sends an update completion notice to the second server apparatus 103 that has sent the information update request. This processing is same as that described above.

After the processing of S804, the server apparatus 103 waits until the update completion notice is received from the server apparatus 103 to which the information update request has been sent (S805).

The update instruction part 324 judges whether the second server apparatus 103 to which the information update request has been sent has updated the information (S806). An example of this processing is same as that of the above-described S506.

When the result of judgment in S806 shows that the information is not updated, then the update instruction part 324 goes to the below-described processing of S808.

When the result of judgment in S806 shows that the information has been updated, then the update execution part 323 updates its own information (S807). An example of this processing is same as that of the above-described S507.

On the other hand, when the result of judgment in S803 shows that it is impossible to access the second server apparatus 103 whose information is to be updated, or when the result of judgment in S806 shows that the information is not updated, then the update instruction part 324 selects the third server apparatus 103 (S808). Here, technique for selecting a substitute server apparatus 103 in the update processing is not particularly restrictive. For example, the update instruction part 324 may select, as the third server apparatus 103, at least one out of all the server apparatuses 103 connected to the communication network 102 except the second server apparatus 103. Or, as described above, the main storage 304 or the like may previously stores a table (not shown) that associates, for each kind of information, identification information of a second server apparatus 103 with identification information of a third server apparatus 103 that acts as a substitute in update of the second server apparatus 103, so that the update instruction part 324 specifies the third server apparatus 103 on the basis of the kind of the new information included in the information update request.

The processing of S808 corresponds to the above-described processing of S703.

The update instruction part 324 generates update instruction data (S809). An example of this processing is same as that of the above-described S508. This processing of S809 corresponds to the above-described processing of S704.

After the processing of S809, the update instruction part 324 sends an update instruction request that includes the generated update instruction data to the third server apparatus 103 selected in the processing of S808 (S810). This processing of S810 corresponds to the above-described processing of S705.

After the processing of S810, the update execution part 323 performs the above-described processing of S807.

On the other hand, when the result of judgment in the above-described S801 shows that the received request has not come from the client terminal 101, the judgment part 322 judges whether the received request is an update instruction request that includes update instruction data or not (S811). To that end, the judgment part 322 makes this judgment depending on whether the received request includes update instruction data or not, for example.

When the result of judgment in S811 shows that the received request is an update instruction request, then the update execution part 323 registers the update process (S812). An example of this processing is same as that of the above-described S509. This processing of S812 corresponds to that of the above-described S707.

The re-update instruction part 325 activated by the processing of S812 performs update processing with respect to the second server apparatus 103 at prescribed time interval or at prescribed date. This processing is same as the above-described operation example of FIG. 6, and thus its description is omitted here. By this processing, the re-update instruction part 325 of the third server apparatus 103 executes an operation example similar to the above described FIG. 6, to send an information update request to the second server apparatus 103. Receiving this information update request, the second server apparatus 103 executes an operation example similar to the above-described one shown in FIG. 8. Thus, in the judgment of S811, it is judged that the received request does not include an update instruction data. Therefore, the flow goes to the below-described processing of S813, to update its own information.

On the other hand, when the result of judgment in S811 shows that the received request is not an update instruction request, then the request is an information update request sent from another server apparatus 103. In that case, the update execution part 323 updates the information (S813). An example of this processing is same as that of the above-described S807. Next, the update execution part 323 sends an update completion notice to the server apparatus 103 that has sent the information update request (S814). An example of this processing is same as that of the above-described S511. After the processing of S814, the processing is ended.

Thus, when it is impossible to access the second server apparatus 103, update instruction data is sent to the third server apparatus 103 as a substitute server apparatus in the update processing. Thereby, also the information after update is duplicated. As a result, even if the information is lost or damaged owing to occurrence of a failure or the like in the first server apparatus 103 before update of the information of the second server apparatus 103, the information of the second server apparatus 103 may be updated on the basis of the update instruction data remaining in the third server apparatus 103.

Third Embodiment

Next, a third embodiment will be described.

As cause of inaccessibility to the first server apparatus 103, it is possible to consider not only the case where a failure such as power-off or disconnection of network cable has occurred, but also the case where the first server apparatus 103 is a portable communication terminal such as a notebook PC for example and is in use out of doors, for example. In the above-described second embodiment, it is possible that update of information occurs while the first server 103 can not be accessed being in use out of doors, for example. In such a case, it is possible that inconsistence occurs between the information held by the first and third server apparatuses 103 and the information held by the second server apparatus 103. In detail, for example, it may be considered that the newest information is obtained not at home from some apparatus or the like and the obtained newest information is made to be newly-registered information of the first server apparatus 103. Or, for example, it may be considered that update of the information is requested a plurality of times from the client terminal 101 while it is impossible to access the second server apparatus 103. In such a case, inconsistence occurs between the information held by the first and third server apparatus 103 and the information held by the second server apparatus 103.

In the third embodiment described in the following, when update of the information occurs while it is impossible to access the second server apparatus 103 and inconsistency of information occurs between the first and third server apparatuses 103 and the second server apparatus 103, the occurrence of the inconsistency is notified to any apparatus.

An apparatus to which occurrence of inconsistency of information is notified is not particularly restricted. For example, one or more of the client terminal 101, the server apparatuses 103, and other information terminals (not shown) connected to the communication network 102 may become such an apparatus. Here, description will be given assuming that a notice is sent to the client terminal 101.

In the following, the embodiment will be described in detail only with respect to different points from the above-described second embodiment.

First, an example of sequence will be described simply. And then, an example of operation of each apparatus will be described in detail. Here, description will be given taking an example where the first server apparatus is the server apparatus 103a, the second server apparatus is the server apparatus 103b and the third server apparatus is the server apparatus 103c.

First, referring to FIG. 9, an example of sequence will be described.

The information update request part 221 of the client terminal 101 sends an information update request to the server apparatus 103a (S901). This information update request includes new information, old information, and information indicating that the source of this information update request is the client terminal 101. An example of this processing is same as those of the above-described S401 and S701.

The judgment part 322 of the server apparatus 103a judges whether the server apparatus 103a may access the server apparatus 103b (S902). Here, it is assumed that the server apparatus 103a may not access the server apparatus 103b. In that case, the update instruction part 324 of the server apparatus 103a selects the third server apparatus (S903). Here, it is assumed that the update instruction part 324 selects the server apparatus 103c as the third server apparatus. The update instruction part 324 generates update instruction data (S904), and sends an update instruction request, which includes the generated update instruction data, to the server apparatus 103c (S905). Further, the update execution part 323 replaces the information 312 in its own main storage 304 with the new information included in the received information update request so that the new information becomes newly-registered information 312 (S906). This processing is same as those in the above-described S703-S706.

Receiving the update instruction data, the re-update instruction part 325 of the server apparatus 103c registers the update instruction data (S907). This processing is same as that of the above-described S707.

At any timing such as after a prescribed time for example, the re-update instruction part 325 of the server apparatus 103c judges whether the server apparatus 103c may access the server apparatus 103b (S908). Here, it is assumed that the server apparatus 103c may access the server apparatus 103b. The re-update instruction part 325 of the server apparatus 103c sends an information update request to the server apparatus 103b (S909). The processing is same as those of the above-described S708 and S709.

The update execution part 323 of the server apparatus 103b judges whether there is inconsistency between the information included in the received information update request and its own information (S910). Here, it is assumed that these pieces of information are judged to be inconsistent. The update execution part 323 of the server apparatus 103b sends inconsistency notification information to the client terminal 101 to notify the existence of inconsistency (S911). This inconsistency notification information includes the information inconsistent with the information held by the server apparatus 103b and the information held by the server apparatus 103b.

The output control part 222 of the client terminal 101 outputs the received inconsistency notification information to the output unit 208 or the like (S912). Here, the inconsistency notification information may be outputted at any timing. The information may be outputted as soon as the information notifying the existence of inconsistency is received, or when the user gives an instruction to output, through the input unit 207, for example.

The user selects either piece of the inconsistent information outputted to the output unit 208, and inputs the selected information through the input unit 207. Receiving the inputted selection (S913), the information update request part 221 of the client terminal 101 makes the selected information become newly-registered information, and sends selection notification information to the server apparatus 103b to notify the result of selection of information (S914). This selection notification information includes the information as the selection result received in the processing of S913.

The update instruction part 324 of the server apparatus 103b sends an information update request that includes the information included in the selection notification information to the server apparatus 103a (S915). Further, the update execution part 323 of the server apparatus 103b replaces the information 312 in its own main storage 304 with the information included in the selection notification information, so that the latter information becomes newly-registered information 312 (S916).

The update execution part 323 of the server apparatus 103a replaces the information 312 in its own main storage 304 with the information included in the information update request, so that the latter information becomes newly-registered information 312 (S917).

Next, referring to FIG. 10, an example of operation of an individual server apparatus 103 will be described.

Figure 10:
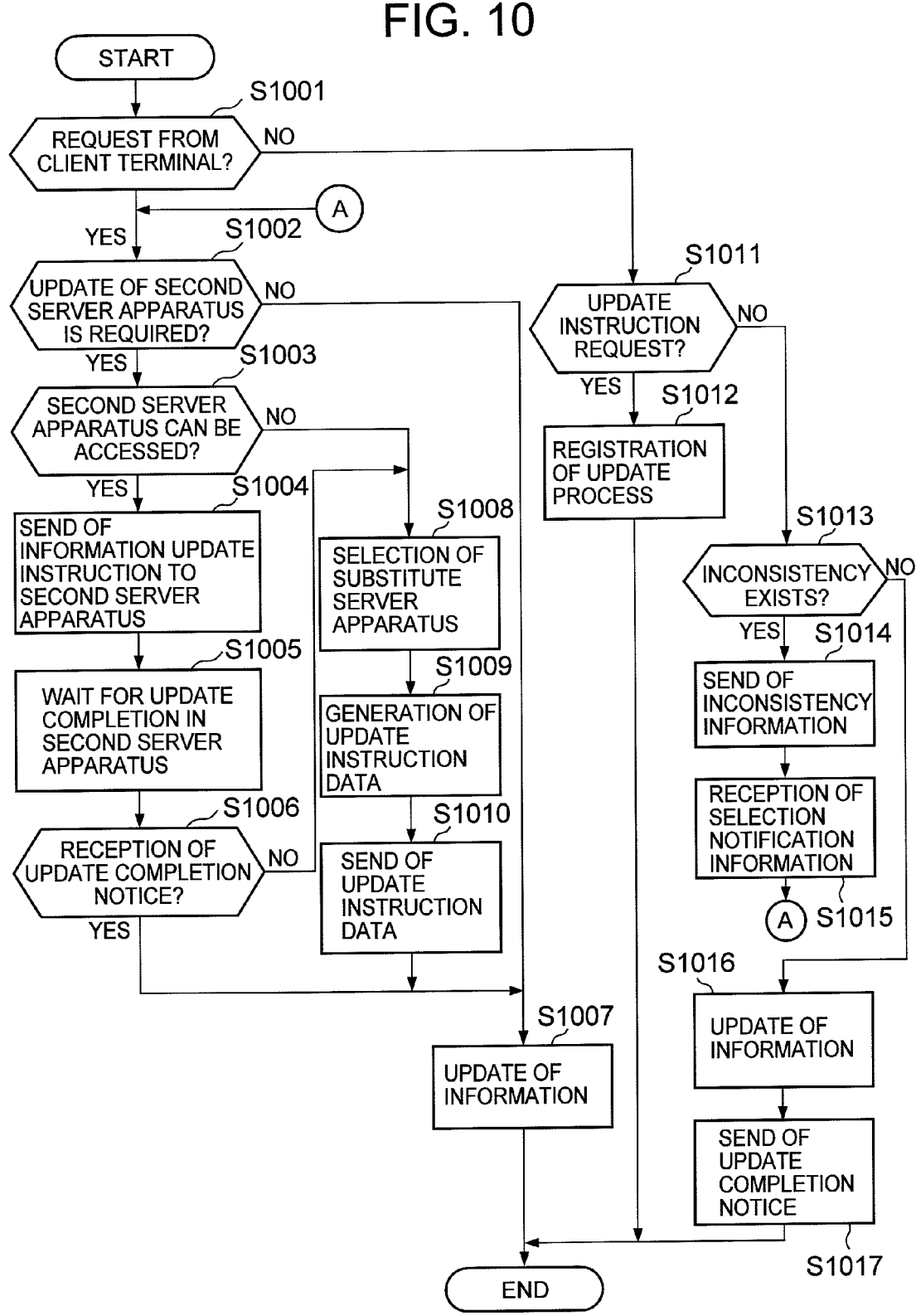
FIG. 10 is a chart showing an example of operation in the third embodiment.

An operation example shown in FIG. 10 is activated when an information update request or an update instruction request is received from the client terminal 101, the first server apparatus 103 or the third server apparatus 103, for example. An example of this operation is same as the above-described one, and thus its description is omitted.

In FIG. 10, the reception part 321 of the server apparatus 103 judges whether the received request has come from the client terminal 101 (S1001). An example of this operation is same as those of the above-described S501 and S801.

When the result of judgment in S1001 shows that the received request has come from the client terminal 101, the judgment part 322 judges whether the information held by the second server apparatus 103 requires update (S1002). An example of this operation is same as those of the above-described S502 and S802 except that this processing of S1002 is performed also when it is judged in the below-described processing of S1013 that inconsistency exists. Here, in the case where it is judged that inconsistency exists, technique for specifying the second server apparatus 103 is not particularly restricted, and the same technique as those of the above-described S502 and S802 may be used, for example.

When the result of judgment in S1002 shows that it is not required to update the information held by the second server apparatus 103, then the update execution 323 performs the below-described processing of S1007.

When the result of judgment in S1002 shows that it is required to update the information held by the second server apparatus 103, then the judgment part 322 judges whether the it is possible to access the second server apparatus 103 whose information is to be updated (S1003). An example of this processing is same as those of the above-described S503 and S803.

When the result of judgment in S1003 shows that it is possible to access the second server apparatus 103 whose information is to be updated, then the update instruction part 324 sends an information update request to that second server apparatus 103 (S1004). An example of this processing is same as those of the above-described S504 and S804 except that new information and old information to be included in the information update request are different when it is judged in the below-described processing of S1013 that inconsistency exists. In the case where the processing of S1004 is performed after it is judged in the below-described processing of S1013 that inconsistency exists, the update instruction part 324 uses, as the new information to be included in the information update request, the information included in the selection notification information received in the below-described processing of S1015. Further, in the case where the processing of S1004 is performed after it is judged in the below-described processing of S1013 that inconsistency exists, the update instruction part 324 uses, as the old information to be included in the information update request, the new information included in the previously-received information update request.

Receiving the information update request from the server apparatus 103, the second server apparatus 103 updates its own information, and thereafter sends an update completion notice to the server apparatus 103 that has sent the information update request. This processing is same as that described above.

After the processing of S1004, the server apparatus 103 waits until the update completion notice is received from the second server apparatus 103 to which the information update request has been sent (S1005).

The update instruction part 324 judges whether the server apparatus 103 to which the information update request has been sent has updated the information (S1006). An example of this processing is same as those of the above-described S506 and S806.

When the result of judgment in S1006 shows that the information is not updated, then the update instruction part 324 goes to the below-described processing of S1008.

When the result of judgment in S1006 shows that the information has been updated, then the update execution part 323 updates its own information (S1007). An example of this processing is same as those of the above-described S507 and S807.

On the other hand, when the result of judgment in the above S1003 shows that it is impossible to access the second server apparatus 103 whose information is to be updated or when the result of judgment in S1006 shows that the information is not updated, then the update instruction part 324 selects the third server apparatus 103 (S1008). An example of this processing is same as that of the above-described S808.

This processing of S1008 corresponds to the above-described processing of S903.

The update instruction part 324 generates update instruction data (S1009). An example of this processing is same as that of the above-described S809 except that new information and old information to be included in the update instruction data are different when it is judged in the below-described processing of S1013 that inconsistency exists. In the case where the processing of S1009 is performed after it is judged in the below-described processing of S1013 that inconsistency exists, the update instruction part 324 uses, as the new information to be included in the update instruction data, the information included in the selection notification information received in the below-described processing of S1015. Further, in the case where the processing of S1009 is performed after it is judged in the below-described processing of S1013 that inconsistency exists, the update instruction part 324 uses, as the old information to be included in the update instruction data, the new information included in the previously-received information update request.

The processing of S1009 corresponds to the above-described processing of S904.

After the processing of S1009, the update instruction part 324 sends an update instruction request that includes the generated update instruction data to the third server apparatus 103 selected in the processing of S1008 (S1010). This processing of S1010 corresponds to the above-described processing of S905.

Next, the update execution part 323 performs the above-described processing of S1007.

On the other hand, when the result of judgment in S1001 shows that the received request has not come from the client terminal 101, then the judgment part 322 judges whether the received request is an update instruction request that includes update instruction data (S1011). An example of this processing is same as that of the above-described S811.

When the result of S1011 shows that the received request is an update instruction request, then the judgment part 322 registers the update process (S1012). An example of this processing is same as that of the above-described S812. This processing of S1012 corresponds to the above-described processing of S907.

When activated by the above-described processing of S1012, the re-update instruction part 325 performs update processing with respect to the second server apparatus 103 at a prescribed time interval or at a prescribed date, for example. This processing is same as the above-described operation example of FIG. 6, and thus its description is omitted. By this processing, the re-update instruction part 325 of the third server apparatus 103 executes the same operation example as the above-described one shown in FIG. 6, and sends an information update request to the second server apparatus 103. Receiving this information update request, the second server apparatus 103 executes the same operation example as the above-described one shown in FIG. 10. In the judgment of S1011, it is judged that the received request is not an update instruction request. Therefore, the flow goes to the processing of S1013, and its own information is updated.

When the result of judgment in S1011 shows that the received request is not an update instruction request, then the received request is an information update request sent from another server apparatus 103. In that case, the update execution part 323 judges whether there is inconsistency of registered information (S1013). To that end, the update execution part 323 obtains a difference between the old information included in the received information update request and the information 312 stored in its own main storage 304, and judges an existence of inconsistency on the basis of this difference. Technique for judging existence of inconsistency is not particularly restricted. For example, in the case where information comprises item values of a plurality of items, the update execution part 323 may judge coincidence of item values for each item. When there exists at least one item for which item values are not coincident, the update execution part 323 judges that there is inconsistency. In that case, it is possible that the update execution part 323 does not use a part of a plurality of items for the judgment of inconsistency.

This processing of S1013 corresponds to the above-described processing of S910.

When the result of judgment in S1013 shows existence of inconsistency, then the update execution part 323 sends inconsistency notification information to notify the existence of inconsistency (S1014). At that time, the update execution part 323 sends inconsistency notification information that includes its own identification information, inconsistency information, the information 312 stored in its own main storage 304, and the like. The inconsistency information is information that indicates a content of inconsistency of the information. In detail, in the case where the information comprises item values of a plurality of items, the inconsistency information shows item values and their items for which the above processing has judged that inconsistency exists, for example.

The processing of S1014 corresponds to the above-described processing of S911.

Now, returning to FIG. 9, the processing in the client terminal 101 in S912-S914 will be described in detail.

Figure 11:
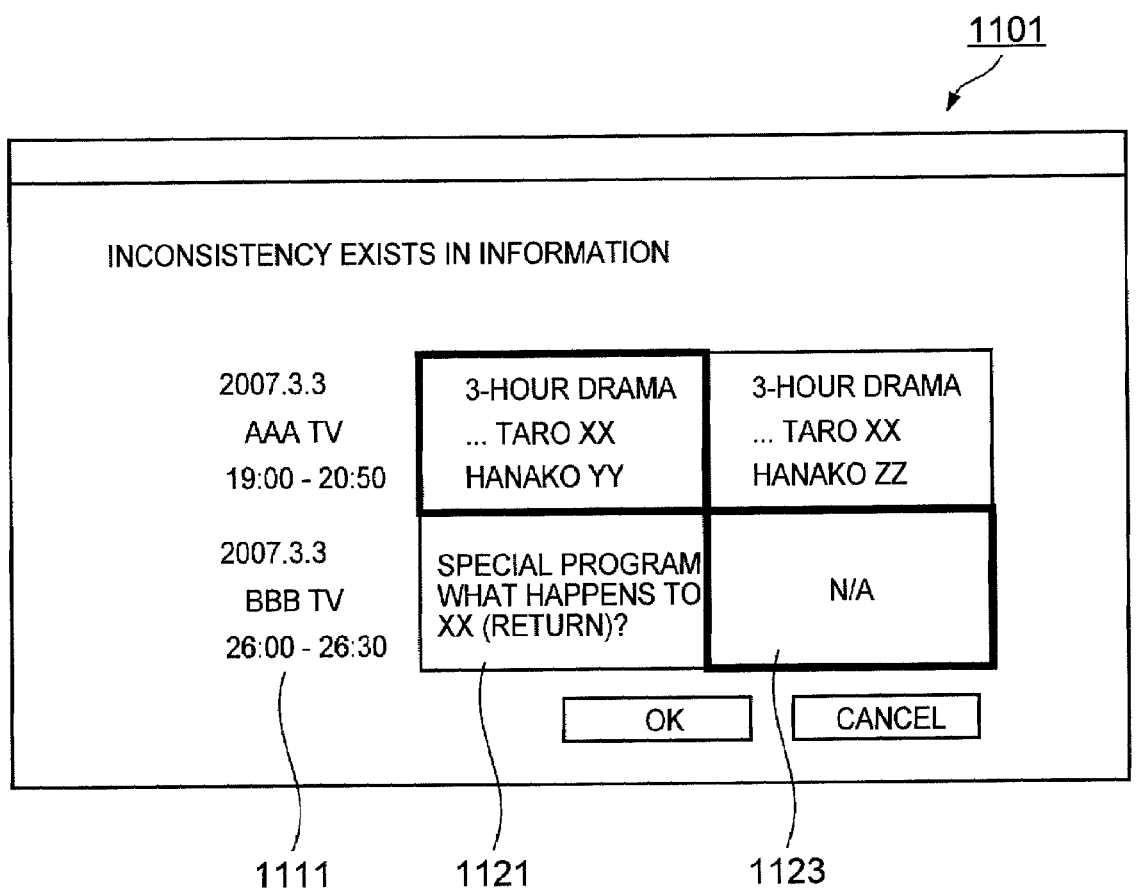
FIG. 11 is a view showing an example of a screen in the third embodiment.

Receiving the inconsistency notification information, the output control part 222 of the client terminal 101 outputs the inconsistency notification information to the output unit 208 at any timing (S912). FIG. 11 shows an example of a screen when the inconsistency notification information is displayed on the display of the output unit 208.

In FIG. 11, the screen 1101 shows an example of display of the inconsistency information (on the information) included in the inconsistency notification information. The screen 1101 has areas 1111, 1121, 1122 and the like. The area 1111 displays each item of the inconsistency information on the information. Each of the areas 1121 and 1122 displays an item value of each item included in the inconsistency information. In the example of FIG. 11, the area 1121 displays item values of items included in the inconsistency information among the item values of the information stored in the main storage 204 of the client terminal 101. Further, the area 1122 displays item values of the items included in the inconsistency information among the item values of the information included in the inconsistency notification information. In the example of FIG. 11, "N/A" in the area 1121 or 1122 means that an item value for that item does not exists.

In detail, an item value of the item "2007.3.3 AAA TV 19:00-20:50" is "3-hour drama . . . Taro XX, Hanako YY" in the information included in the update instruction data sent by the server apparatus 103c, while "3-hour drama . . . Taro XX, Hanako ZZ" in the information 312 stored in the main storage 204 of the server apparatus 103b.

Figure 9:
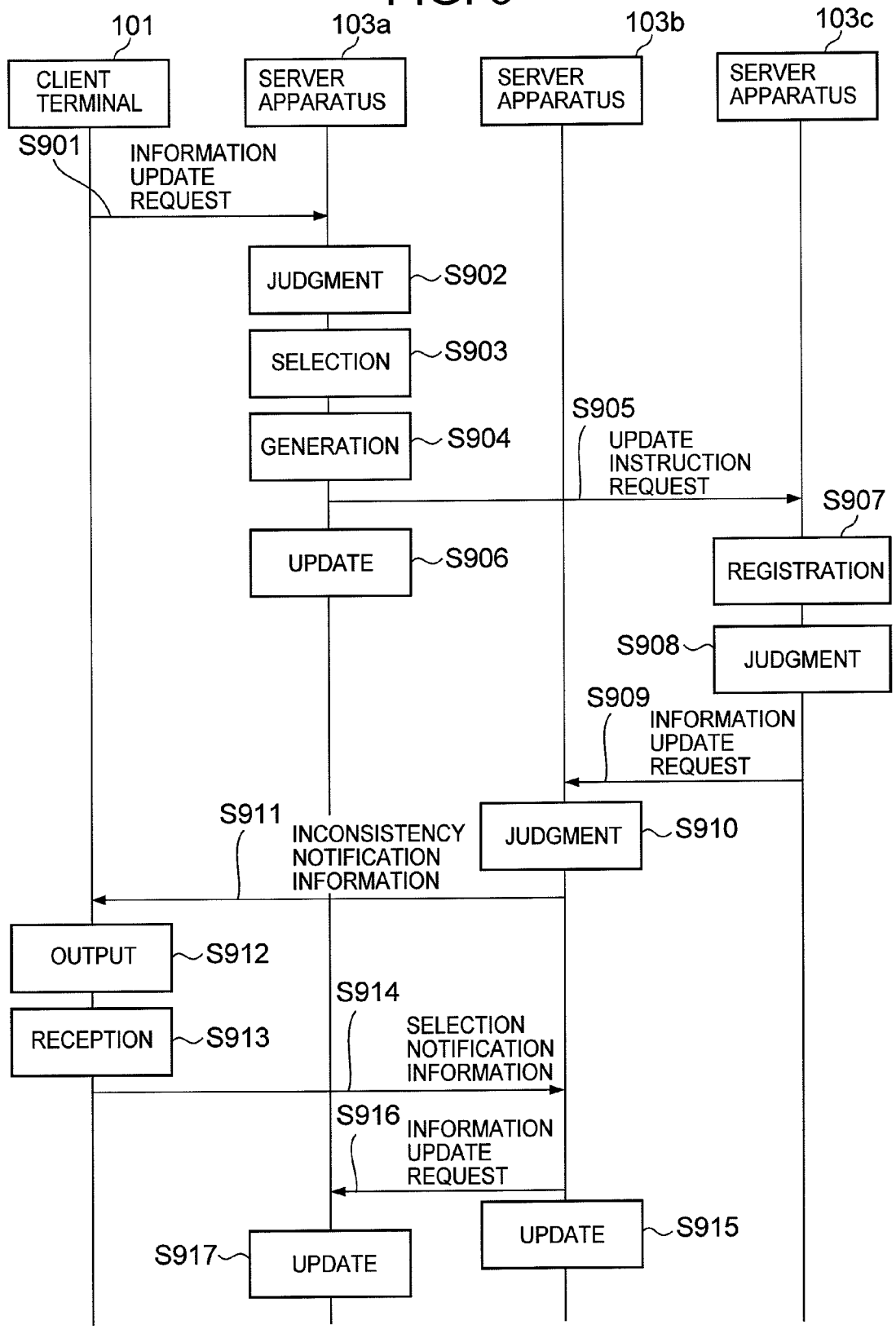
FIG. 9 is a diagram showing an example of a sequence in a third embodiment.

In FIG. 9, the information update request part 221 of the client terminal 101 receives the selected item values (S913). To that end, the user selects either piece of information between the two pieces of information shown in the inconsistency information displayed, for example, and makes the selected piece of information become the new information. In detail, in the above example of screen shown in FIG. 11, the user gives an instruction to select or delete one of the item values displayed in the areas 1121 and 1122 for each item of the area 1111, by using the input unit 207 of the client terminal 101, so that either of the item values is selected for each item. The information update request part 221 takes the values of the user's instruction as the selected item values.

Next, the information update request part 221 of the client terminal 101 makes the selected item values as item values of the corresponding items of the information, to take these values as the new information, and sends a selection notification information that includes the new information to the sender of the inconsistency notification information (S914).

For example, in the case where information indicating selection of the item value "3-hour drama . . . Taro XX, Hanako ZZ" between the item values "3-hour drama . . . Taro XX, Hanako YY" and "3-hour drama . . . Taro XX, Hanako ZZ" of the item "2007.3.3 AAA TV 19:00-20:50" is inputted through the input unit 207, then the information update request part 221 replaces the item value of the item "2007.3.3 AAA TV 19:00-20:50" of the information with the value "3-hour drama . . . Taro XX, Hanako ZZ". The information update request part 221 sends selection notification information that includes the thus-obtained new information to the server apparatus 103b.

Returning to FIG. 10, when the server apparatus 103 receives the selection notification information (S1015), the flow goes to the above-described processing of S1002. By this, it becomes possible that the server apparatus 103 having the newest information instructs the other server apparatuses to update their information into the newest information held by the server apparatus 103.

On the other hand, when the result of judgment in S103 shows that inconsistency does not exist, the update execution part 323 updates the information (S1016). An example of this processing is same as that of the above-described S1007. Next, the update execution part 323 sends an update completion notice to the server apparatus 103 that is the sender of the information update request (S1017). An example of this processing is same as those of the above-described S511 and S814. After the processing of S1017, the processing is ended.

Thus, the user may select information to be used for update, when the inconsistency of information occurs and update the information into the selected information.

Fourth Embodiment

Next, a fourth embodiment will be described.

In the above-described third embodiment, when inconsistency of information is detected, inconsistency notification information is sent to the client terminal 101 to inquire about a countermeasure. In contrast with this, in the fourth embodiment described in the following, when inconsistency of information is detected, a new piece of information is registered as information to be used for update, and notifies any apparatus which piece has been registered.

An apparatus to which the result of selection of information is notified is not particularly restricted. For example, one or more of the client terminal 101, the server apparatuses 103, and other information terminals (not shown) connected to the communication network 102 may become such an apparatus. Here, description will be given assuming that a notice is sent to the client terminal 101.

In the following, the embodiment will be described in detail only with respect to different points from the above-described third embodiment.

First, an example of sequence will be described simply. And then, an example of operation of each apparatus will be described in detail. Here, description will be given taking an example where the first server apparatus is the server apparatus 103a, the second server apparatus is the server apparatus 103b and the third server apparatus is the server apparatus 103c.

Figure 12:
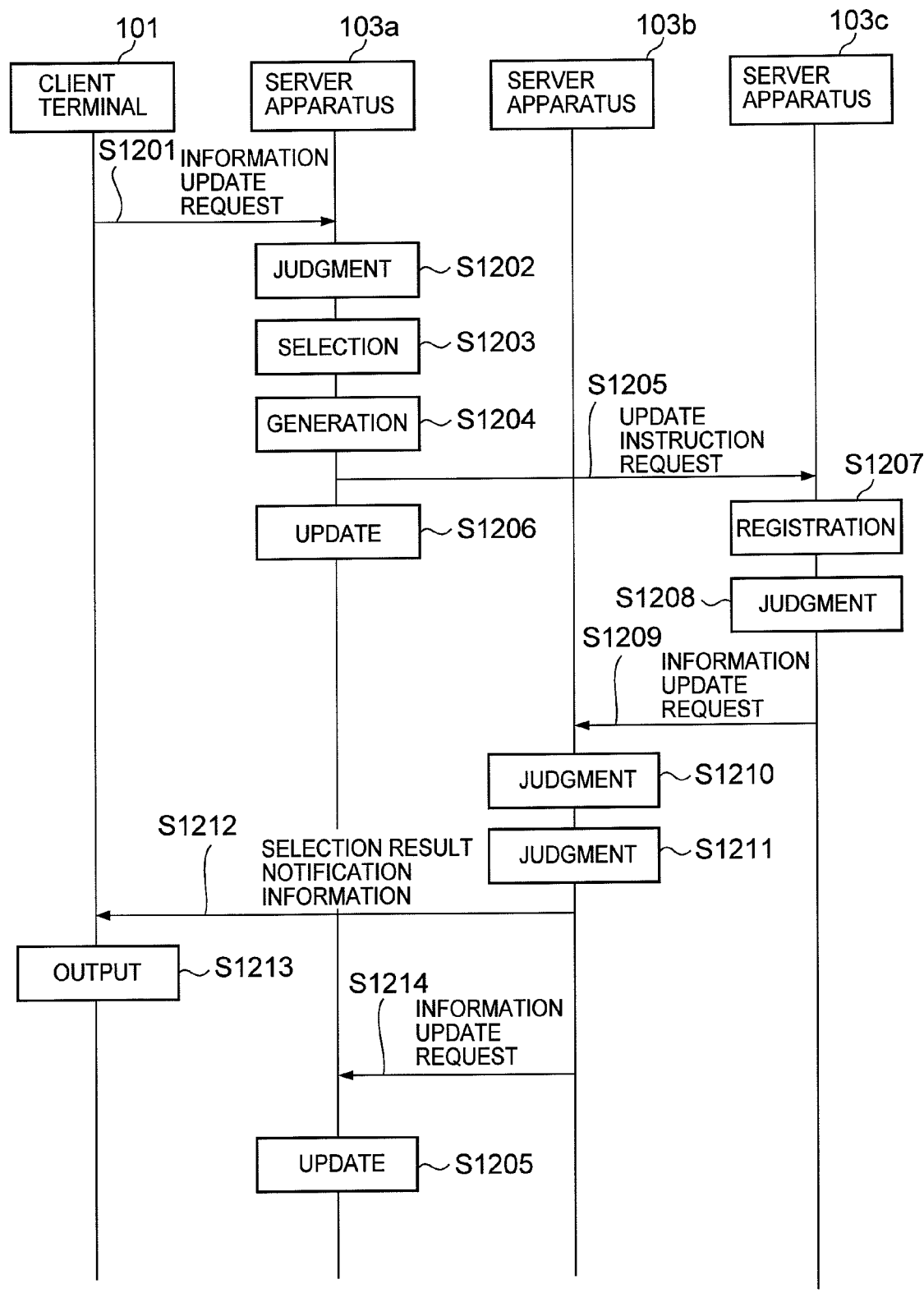
FIG. 12 is a diagram showing an example of a sequence in a fourth embodiment.

First, referring to FIG. 12, an example of sequence will be described.

The information update request part 221 of the client terminal 101 sends an information update request to the server apparatus 103a (S1201). This information update request includes new information, old information, and information indicating that the source of this information update request is the client terminal 101.

The judgment part 322 of the server apparatus 103a judges whether the server apparatus 103a may access the server apparatus 103b (S1202). Here, it is assumed that the server apparatus 103a can not access the server apparatus 103b. In that case, the update instruction part 324 of the server apparatus 103a selects the third server apparatus (S1203). Here, it is assumed that the update instruction part 324 selects the server apparatus 103c as the third server apparatus. The update instruction part 324 generates update instruction data (S1204), and sends an update instruction request that includes the generated update instruction data to the server apparatus 103c (S1205). Further, the update instruction part 324 replaces the information 312 in its own main storage 304 with the new information included in the received information update request, so that the new information becomes newly-registered information 312 (S1206).

Receiving the update instruction data, the re-update instruction part 325 of the server apparatus 103c registers the update instruction data (S1207).

At any timing such as after a prescribed time for example, the re-update instruction part 325 of the server apparatus 103c judges whether the server apparatus 103c may access the server apparatus 103b (S1208). Here, it is assumed that the server apparatus 103c may access the server apparatus 103b. The re-update instruction part 325 of the server apparatus 103c sends an information update request to the server apparatus 103b (S1209).

Up to this point, the processing is same as the above-described processing of S901-S909.

The update execution part 323 of the server apparatus 103b judges whether inconsistency exists between the information included in the received information update request and its own information (S1210). This processing is same as that of the above-described S909. Here, it is assumed that it is judged that inconsistence exists. The update execution part 323 of the server apparatus 103b judges which is newer, the information included in the received information update request or its own information (S1211). Here, it is assumed that the information included in the received information update request is judged to be new. The update execution part 323 sends selection result notification information to the client terminal 101 to notify the selected information between the information included in the received information update request and its own information (S1212).

The output control part 222 of the client terminal 101 outputs the received selection result notification information to the output unit 208 or the like (S1213). Here, the selection result notification information may be outputted at any timing. The selection result notification information may be outputted as soon as the information is received, or, when the user gives an instruction to output, through the input unit 207, for example.

Further, the update instruction part 324 of the server apparatus 103b sends an information update request that includes the information held by the server apparatus 103b to the server apparatus 103a (S1214).

The update execution part 323 of the server apparatus 103a replaces the information in its own main storage 304 with the information included in the information update request, so that the latter information becomes newly-registered information 312 (S1215).

Next, referring to FIG. 13, an example of operation of an individual server apparatus 103 will be described.

Figure 13:
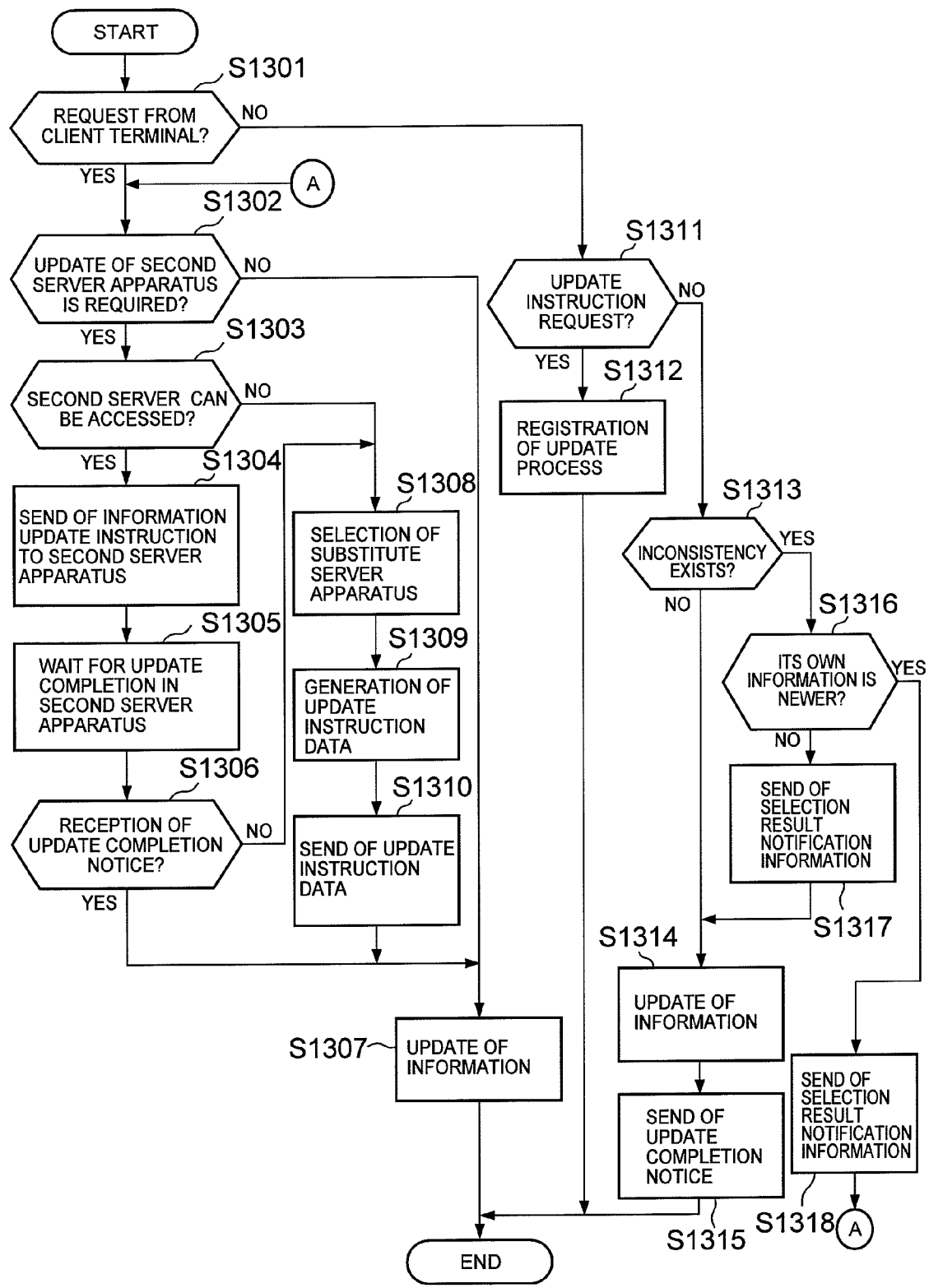
FIG. 13 is a chart showing an example of operation in the fourth embodiment.

An operation example shown in FIG. 13 is activated when an information update request or an update instruction request is received from the client terminal 101, the first server apparatus 103 or the third server apparatus 103, for example. An example of this operation is same as that described above, and thus its description is omitted here.

In FIG. 13, the reception part 321 of a server apparatus 103 judges whether the received request has come from the client terminal 101 (S1301). An example of this operation is same as those of the above-described S501, S801 and S1001.

When the result of judgment in S1301 shows that the received request has come from the client terminal 101, then the judgment part 322 judges whether the information held by the second server apparatus 103 requires update (S1302). An example of this operation is same as those of the above-described S502, S802 and S1002 except that the processing of S1302 is performed also when it is judged in the below-described processing of S1316 that its own information 312 is the newest information. Here, in the case where it is judged that its own information is the newest information, technique for specifying the second server apparatus 103 is not particularly restricted, and the same technique as those of the above-described S502, S802 and S1002 may be used, for example.

When the result of judgment in S1302 shows that it is not required to update the information held by the second server apparatus 103, then the update execution part 323 performs the below-described processing of S1307.

When the result of judgment in S1302 shows that it is required to update the information held by the second server apparatus 103, then the judgment part 322 judges whether it is possible to access the second server apparatus 103 whose information is to be updated (S1303). An example of this processing is same as those of the above-described S503, S803 and S1003.

When the result of judgment in S1303 shows that it is possible to access the second server apparatus 103 whose information is to be updated, then the update instruction part 324 sends an information update request to the server apparatus 103 (S1304). An example of this processing is same as those of the above-described S504, S804 and S1004 except that new information and old information to be included in the information update request are different when it is judged in the below-described processing of S1316 that its own information is newer. In the case where the processing of S1304 is performed after it is judged in the below-described processing of S1316 that its own information is newer, the update instruction part 324 uses, as the new information to be included in the information update request, the information 312 stored in the its own main storage 304. Further, in the case where the processing of S1304 is performed after it is judged in the below-described processing of S1316 that its own information is newer, the update instruction part 324 uses, as the old information to be included in the information update request, the new information included in the previously-received information update request.

Receiving the information update request from the server apparatus 103, the second server apparatus 103 updates its own information, and thereafter sends an update completion notice to the server apparatus 103 that has sent the information update request. This processing is same as that described above.

After the processing of S1304, the server apparatus 103 waits until the update completion notice is received from the second server apparatus 103 to which the information update request has been sent (S1305).

The update instruction part 324 judges whether the second server apparatus 103 to which the information update request has been sent has updated the information (S1306). An example of this processing is same as those of the above-described S506, S806 and S1006.

When the result of judgment in S1306 shows that the information is not updated, then the update instruction part 324 goes to the below-described processing of S1308.

When the result of judgment in S1306 shows that the information has been updated, then the update execution part 323 updates its own information (S1307). An example of this processing is same as those of the above-described S507, S807 and S1007.

On the other hand, when the result of judgment in the above S1303 shows that it is impossible to access the second server apparatus 103 whose information is to be updated, then the update instruction part 324 selects the third server apparatus 103 (S1308). An example of this processing is same as those of the above described S808 and S1008.

This processing of S1308 corresponds to the above-described processing of S1203.

The update instruction part 324 generates update instruction data (S1309). An example of this processing is same as those of the above-described S508 and S1009 except that new information and old information to be included in the update instruction data are different when it is judged in the below-described processing of S1316 that its own information is newer. In the case where the processing of S1304 is performed after it is judged in the below-described processing of S1316 that its own information is newer, the update instruction part 324 uses, as the new information to be included in the update instruction data, the information 312 stored in its own main storage 304. Further, in the case where the processing of S1304 is performed after it is judged in the below-described processing of S1316 that its own information is newer, the update instruction part 324 uses, as the old information to be included in the update instruction data, new information included in the previously-received update instruction data.

The processing of S1309 corresponds to the above-described processing of S1204.

After the processing of S1309, the update instruction part 324 sends an update instruction request that includes the generated update instruction data to the third server apparatus 103 selected in the processing of S1308 (S1310). This processing of S1310 corresponds to the above-described processing of S1205.

Next, the update instruction part 324 goes to the above-described processing of S1307.

On the other hand, when the result of judgment in S1301 shows that the received request has not come from the client terminal 101, then the update execution part 323 judges whether the received request is an update instruction request that includes update instruction data (S1311). An example of this processing is same as those of the above-described S811 and S1011.

When the result of S1311 shows that the received request is an update instruction request, then the update execution part 323 registers the update process (S1312). An example of this processing is same as those of the above-described S812 and S1012. This processing of S1312 corresponds to the above-described processing of S1207.

The re-update instruction part 325 activated by the above-described processing of S1312 performs update processing with respect to the second server apparatus 103 at a prescribed time interval or at a prescribed date. This processing is same as the above-described operation example of FIG. 6, and thus its description is omitted here. By this, the re-update instruction part 325 of the third server apparatus 103 executes the same operation example as that of FIG. 6, and sends an information update request to the second server apparatus 103. Receiving this information update request, the second server apparatus 103 executes the same operation example as that of FIG. 13. Thus, in the judgment of S1311, it is judged that the received request is not an update instruction request. Therefore, the flow goes to the processing of S1313, to perform the same processing as described above.

On the other hand, when the result of judgment in S1311 shows that the received request is not an update instruction request, then the request is an information update request sent from another server apparatus 103. In that case, the update execution part 323 judges whether there is inconsistency of information (S1313). This processing is same as the above-described processing of S1013. This processing of S1313 corresponds to the above-described processing of S1210.

When the result of judgment in S1313 shows that inconsistency does not exist, then the update execution part 323 updates the information (S1314). An example of this processing is same as the above-described processing of S1307. Next, the update execution part 323 sends an update completion notice to the server apparatus 103 that is the sender of the information update request (S1315). An example of this processing is same as those of the above-described S511, S814 and S1017. After the processing of S1315, the processing is ended.

On the other hand, when the result of judgment in S1313 shows that inconsistency exists, then the update execution part 323 judges whether the information 312 stored in its own main storage 304 is newer than the new information included in the received information update request (S1316). To that end, the update execution part 323 judges which piece of information is newer, on the basis of an information update identifier included in the information. This information update identifier is at least one of the time when the information was generated or provided and the number of update of version or the like, for example. An information update identifier is given to at least one piece of information among each piece of information or all pieces of information. This information update identifier may be included in any place. For example, an information update identifier may be included in a file name of information, or may be included as one of the item values constituting information. Further, it is not necessary that an information update identifier is previously included in the information. For example, an information update identifier may be obtained from the server apparatus 103a or the like. Further, any apparatus may give an information update identifier. For example, an information update identifier may be already included in the information at the time when the information is obtained from the outside or the like. Or, either the client terminal 101 or the server apparatus 103a may include an information update identifier in the information.

The processing of S1316 corresponds to the above-described processing of S1211.

When the result in judgment of S1316 shows that the information 312 stored in its own main storage 304 is older than the new information included in the received information update request, then the update execution part 323 sends selection result notification information to the client terminal 101, to notify the selection of the new information included in the received information update request (S1317). The update execution part 323 sends the selection result notification information that includes the fact of selection of the new information included in the received information update request, the inconsistency information of the information, the information 312 stored in its own main storage 304, and the like.

After the processing of S1317, the flow goes to the above-described processing of S1314.

On the other hand, when the result of judgment in S1316 shows that the information 312 stored in its own main storage 304 is newer than the new information included in the received information update request, then the update execution part 323 sends selection result notification information to the client terminal 101, to notify the selection of the information 312 stored in its own main storage 304 (S1318). The update execution part 323 sends the selection result notification information that includes the fact of selection of the information 312 stored in its own main storage 304, the inconsistency information indicating the content of inconsistency, the information 312 stored in its own main storage 304, and the like. The inconsistency information is, for example, items whose item values have been judged to be non-coincident in the above-described processing of S1313. After this processing, the flow goes to the above-described processing of S1302. By this, it becomes possible that the server apparatus 103 having the newest information instructs the other server apparatuses 103 to update their information into the newest information held by the server apparatus 103.

Next, returning to FIG. 12, the processing of S1213 in the client terminal 101 will be described in detail.

Receiving the selection result notification information, the output control part 222 of the client terminal 101 outputs the selection result notification information to the output unit 208 at any timing (S1213). Here, FIG. 14 shows an example of a screen when the selection result notification information is displayed on the display of the output unit 208.

Figure 14:
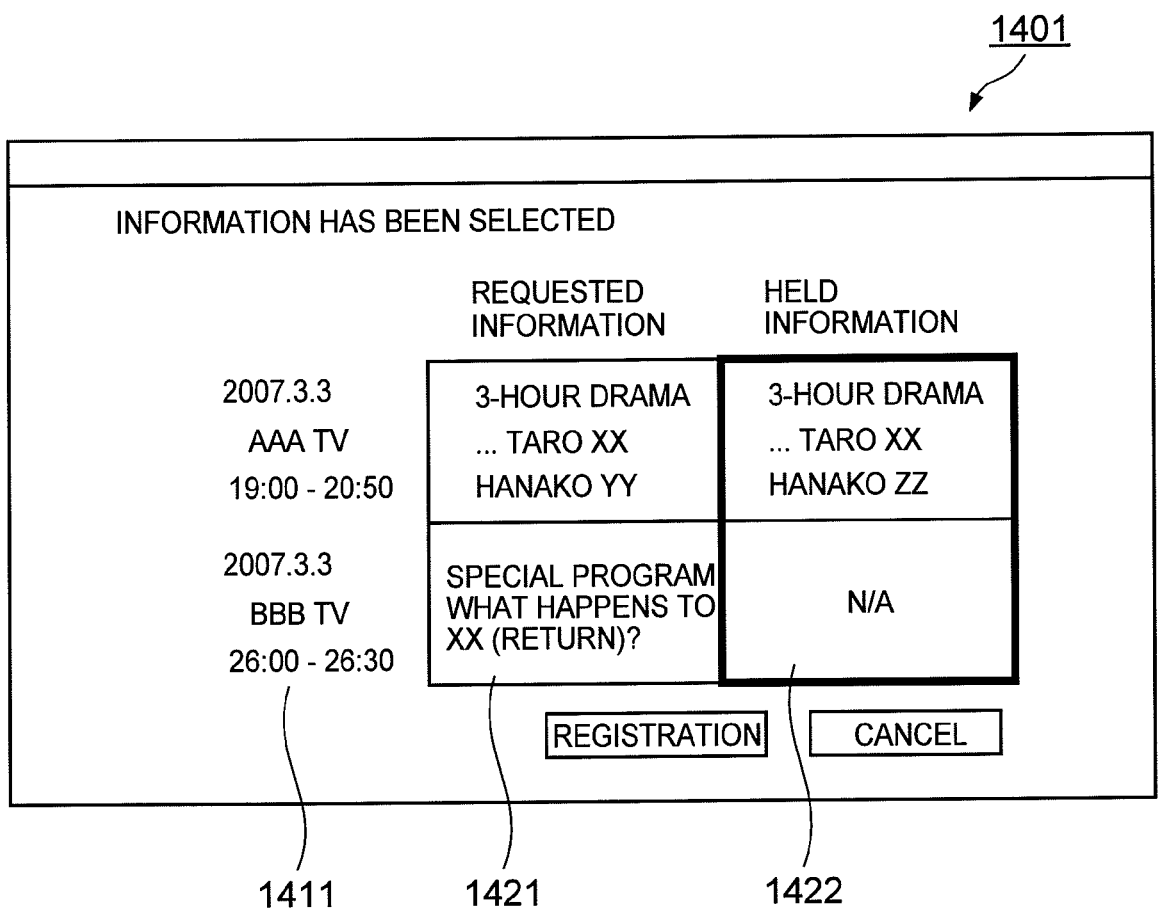
FIG. 14 is a view showing an example of a screen in the fourth embodiment.

In FIG. 14, a screen 1401 is an example where the information inconsistency information included in selection result notification information is displayed. The screen 1401 comprises has areas 1411, 1421, 1422 and the like. The area 1411 displays each item of the selection result notification information of the information. Each of the areas 1421 and 1422 displays an item value of each item included in the selection result notification information. In the example of FIG. 14, the area 1421 displays item values of items included in the inconsistency information among the item values of the information stored in the main storage 204 of the client terminal 101. Further, the area 1422 displays item values of the items included in selection result information among the item values of the information included in the selection result notification information. In the example of FIG. 14, "N/A" in the area 1421 or 1422 means that an item value for that item does not exists. The information update request part 221 displays one of the areas 1421 and 1422 in a change display format in order to indicate that the area of the changed format corresponds to the selected information included in the selection result notification information. The example of FIG. 14 shows that the information displayed in the area 1422 has been selected.

In the above embodiment, the update processing is performed after the selection result notification information is sent. However, order of processing is not limited to this. For example, the selection result notification information may be sent after the update processing is performed.

As described above, according to the fourth embodiment, when there exists an inconsistency in the information, it is possible to select newer information as information to be used for update and to notify the selected information.

Hereinabove, embodiments of the present invention have been described in detail referring to the drawings. However, detailed configurations are not limited to the ones described in these embodiments, and may include design variations within the scope and gist of the present invention.

For example, in the above-described fourth embodiment, when the client terminal 101 receives selection result notification information and the selection result notification information includes the fact of selection of the information 312 stored in the main storage 204 of the server apparatus 103b, then an information update request that includes the information included in the selection result notification information may be sent to any server apparatus 103 or the like. By this operation, it is possible to perform again the update processing starting from the S1301.

Further, in the above-described first through fourth embodiments, it is assumed that an information update request from the client terminal 101 becomes the trigger for information update. However, the present invention is not limited to this. It is possible that the server apparatus 103a (the first server apparatus) sends an information update request, an update instruction request, or the like to other server apparatuses at prescribed time intervals or at prescribed dates, or when its own information is updated, for example.

Further, the inconsistency information in the above-described third and fourth embodiments is not limited to those described above. It is sufficient that the content of inconsistency may be recognized. For example, a server apparatus 103 may contain inconsistent item values themselves.

Further, in the above-described embodiments, a server apparatus sends an update completion notice only when information is sent in response to an information update request sent from another server apparatus. The present invention is not limited to this. For example, an update completion may be sent also when information is sent in response to an information update request sent from the client terminal. Further, an update completion notice does not need to be sent to only the apparatus that has sent an information update request, and may be sent to the client terminal, a server apparatus, or another apparatus (not shown), for example.

The invention claimed is:

1. An information update method for updating information stored in a first storage unit and information stored in a second storage unit in an information update system comprising a first server having the first storage unit, a second server having the second storage unit, and a client device which requests update of information directed to the first server and the second server, and where the first server is coupled to the second server, wherein:

the client device executes:
a first update request sending operation in which an information update request having information which relates to update of the information and includes update information to be updated, is sent to the first server; and the first server executes:
a first update request receiving operation for receiving the information update request sent from the client device;
a first judgment operation in which it is judged whether a first access from the first server to the second server is possible;
a second update request sending operation in which the information update request is sent to the second server when a result of the first judgment operation shows that the first access is possible;
a second judgment operation in which the first server makes a judgment whether a second access is possible, when a result of the first judgment operation shows that the first access is not possible, and during a period after a predetermined time lapses since a judgment is made by the first judgment operation;
a third update request operation in which the first server sends the information update request to the second server when the second judgment judges that the second access is possible; and
a first update operation in which the update information included in the information update request is stored in the first storage unit based on the information update request; and the second server executes:
a second update request receiving operation for receiving the information update request from the first server;
an inconsistency judgment operation in which the second server judges whether an inconsistency exists between the update information included in the information update request and the information stored in the storage unit of the second server, when the information update request is received from the first server, an inconsistency notification operation in which the second server sends inconsistency information that indicates a content of inconsistency of the information update information stored in the second storage unit, and a server identifier that is information based on which the client device identifies the second server, to the client device, when it is judged that the inconsistency exists in the inconsistency judgment operation;

an update information receiving operation for receiving the update information determined by the client device based on the inconsistency information that is sent from the second server in the inconsistency notification operation, the update information stored in the second storage unit, and the server identifier; and a second update operation in which the update information received from the client device in the update information receiving operation is stored in the second storage unit.

2. An information update system comprising a first server having a first storage unit, a second server having a second storage unit, and a client device which requests update of information directed to the first server and the second server, and where the first server is coupled to the second server, wherein:

the client device is adapted to execute:

a first update request sending operation in which an information update request having information which relates to update of the information and includes update information to be updated, is sent to the first server; and the first server is adapted to execute:

a first update request receiving operation for receiving the information update request sent from the client device;

a first judgment operation in which it is judged whether a first access from the first server to the second server is possible;

a second update request sending operation in which the information update request is sent to the second server when a result of the first judgment operation shows that the first access is possible;

a second judgment operation in which the first server makes a judgment whether a second access is possible, when a result of the first judgment operation shows that the first access is not possible, and during a period after a predetermined time lapses since a judgment is made by the first judgment operation;

a third update request operation in which the first server sends the information update request to the second server when the second judgment judges that the second access is possible; and a first update operation in which the update information included in the information update request is stored in the first storage unit based on the information update request; and the second server is adapted to execute:

a second update request receiving operation for receiving the information update request from the first server;

an inconsistency judgment operation in which the second server judges whether an inconsistency exists between the update information included in the information update request and the information stored in the storage unit of the second server, when the information update request is received from the first server, an inconsistency notification operation in which the second server sends inconsistency information that indicates a content of inconsistency of the information update information stored in the second storage unit, and a server identifier that is information based on which the client device identifies the second server, to the client device, when it is judged that the inconsistency exists in the inconsistency judgment operation;

an update information receiving operation for receiving the update information determined by the client device based on the inconsistency information that is sent from the second server in the inconsistency notification operation, the update information stored in the second storage unit, and the server identifier; and a second update operation in which the update information received from the client device in the update information receiving operation is stored in the second storage unit.

3. An information update system comprising a first server having a first storage unit, a second server having a second storage unit, a third server, and a client device which requests update of information directed to the first server and the second server, and where the first server, second server and third server, are coupled to each other, wherein:

the client device is adapted to execute:

a first update request sending operation in which an information update request having information which relates to update of the information and includes update information to be updated, is sent to the first server; and the first server is adapted to execute:

a first update request receiving operation for receiving the information update request sent from the client device;

a first judgment operation in which it is judged whether a first access from the first server to the second server is possible;

a second update request sending operation in which the information update request is sent to the second server when a result of the first judgment operation shows that the first access is possible;

a registration instruction sending operation in which the information update request is sent to the third server when a result of the first judgment operation shows that the second server is inaccessible;

a first update operation in which the update information included in the information update request is stored in the first storage unit based on the information update request; and the third server is adapted to execute:

a registration instruction receiving operation for receiving the information update request sent from the first server;

a second judgment operation in which the third server makes a judgment whether a second access is possible, when a result of the first judgment operation shows that the first access is not possible, and during a period after a predetermined time lapses since a judgment is made by the first judgment operation;

a third update request operation in which the third server sends the information update request to the second server when the second judgment judges that the second access is possible; and the second server is adapted to execute:

a second update request receiving operation for receiving the information update request from the third server;

an inconsistency judgment operation in which the second server judges whether an inconsistency exists between the update information included in the information update request and the information stored in the storage unit of the second server, when the information update request is received from the first server, an inconsistency notification operation in which the second server sends inconsistency information that indicates a content of inconsistency of the information update information stored in the second storage unit, and a server identifier that is information based on which the client device identifies the second server, to the client device, when it is judged that the inconsistency exists in the inconsistency judgment operation;

an update information receiving operation for receiving the update information determined by the client device based on the inconsistency information that is sent from the second server in the inconsistency notification operation, the update information stored in the second storage unit, and the server identifier; and a second update operation in which the update information received from the client device in the update information receiving operation is stored in the second storage unit.

4. An information update method for updating information stored in a first storage unit and information stored in a second storage unit in an information update system comprising a first server having the first storage unit, a second server having the second storage unit, a third server, and a client device which requests update of information directed to the first server and the second server, and where the first server, second server and third server, are coupled to each other, wherein:

the client device executes:

a first update request sending operation in which an information update request having information which relates to update of the information and includes update information to be updated, is sent to the first server; and the first server executes:

a first update request receiving operation for receiving the information update request sent from the client device;

a first judgment operation in which it is judged whether a first access from the first server to the second server is possible;

a second update request sending operation in which the information update request is sent to the second server when a result of the first judgment operation shows that the first access is possible;

a registration instruction sending operation in which the information update request is sent to the third server when a result of the first judgment operation shows that the second server is inaccessible;

a first update operation in which the update information included in the information update request is stored in the first storage unit based on the information update request; and the third server executes:

a registration instruction receiving operation for receiving the information update request sent from the first server;

a second judgment operation in which the third server makes a judgment whether a second access is possible, when a result of the first judgment operation shows that the first access is not possible, and during a period after a predetermined time lapses since a judgment is made by the first judgment operation;

a third update request operation in which the third server sends the information update request to the second server when the second judgment judges that the second access is possible; and the second server executes:

a second update request receiving operation for receiving the information update request from the third server;

an inconsistency judgment operation in which the second server judges whether an inconsistency exists between the update information included in the information update request and the information stored in the storage unit of the second server, when the information update request is received from the first server, an inconsistency notification operation in which the second server sends inconsistency information that indicates a content of inconsistency of the information update information stored in the second storage unit, and a server identifier that is information based on which the client device identifies the second server, to the client device, when it is judged that the inconsistency exists in the inconsistency judgment operation;

an update information receiving operation for receiving the update information determined by the client device based on the inconsistency information that is sent from the second server in the inconsistency notification operation, the update information stored in the second storage unit, and the server identifier; and a second update operation in which the update information received from the client device in the update information receiving operation is stored in the second storage unit.

5. An information update method of claim 4, wherein:

in the registration instruction sending operation, update instruction information including the information before update as old information, and new information to replace the information before update, is outputted; and in the third update request operation, an information update request including the new information and the old information that are included in the update instruction information, is outputted.

6. An information update method of claim 5, wherein:

the second server further executes a consistency judgment operation in which, when the information update request is received, it is judged whether the old information included in the information update request coincides with the information stored in the second storage unit; and when a result of the judgment shows coincidence, then the second server makes the second storage unit store the information included in the information update request; when the result of the judgment shows non-coincidence, then the second server outputs the information stored in the second storage unit and the new information included in the information update request to an output unit; and, when information selecting either of the information and the new information outputted to the output unit is inputted through an input unit, then the second server makes the second storage unit store the selected information; and further the second server sends an information update request including the selected information to the first server; and when the first server receives the information update request sent from the second server, the first server makes the first storage unit store the information included in the information update request.

7. An information update method of claim 4, wherein:

each of the first and second storage units further stores an update identifier that indicates a state of update of the information.

8. An information update method of claim 7, wherein:

the update identifier is at least one of a date of update and a number of update of the information.

9. An information update method of claim 8, wherein:

the information comprises plural sub-information; and the update identifier shows a same value for all the plural sub-information constituting the information.

10. An information update method of claim 8, wherein:

the information comprises plural sub-information; and the update identifier is managed separately for each of the plural sub-information constituting the information.

11. An information update method of claim 7, wherein:
in the registration instruction sending operation, the first server sends update instruction information that includes the information and the update identifier of the information;
in the third update request operation, the third server sends an information update request that includes the information and the update identifier included in the update instruction information; and
the second server further executes:
a comparison operation in which the update identifier of the information included in the information update request is compared with the update identifier of the information stored in the second storage unit; and
an instruction operation in which, when a result of the comparison shows that the update identifier of the information stored in the second storage unit is newer, then an information update request including the information and the update identifier stored in the second storage unit is sent to the first server; and
when the first sever receives the information update request sent from the second server, the first sever makes the first storage unit store the information included in the information update request.

12. An information update method of claim 11, wherein:
the second server further executes a notification operation in which a notice is outputted to the output unit to notify that, between the update identifier of the information included in the information update request and the update identifier of the information stored in the second storage unit, the information whose update identifier shows a newer update state becomes the information stored in the second storage unit.

* * * * *